United States Patent
Rempel et al.

(10) Patent No.: US 8,233,738 B2
(45) Date of Patent: *Jul. 31, 2012

(54) ENHANCING DYNAMIC RANGES OF IMAGES

(75) Inventors: Allan Rempel, Richmond (CA); Wolfgang Heidrich, Vancouver (CA); Helge Seetzen, Vancouver (CA); Gregory John Ward, Albany, CA (US); Lorne A. Whitehead, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 12/183,033

(22) Filed: Jul. 30, 2008

(65) Prior Publication Data

US 2009/0034868 A1 Feb. 5, 2009

Related U.S. Application Data

(63) Continuation-in-part of application No. 12/182,121, filed on Jul. 29, 2008.

(60) Provisional application No. 60/962,708, filed on Jul. 30, 2007.

(51) Int. Cl.
*G06K 9/40* (2006.01)

(52) U.S. Cl. ......... 382/264; 382/260; 382/274

(58) Field of Classification Search ......... 382/169, 382/173, 232, 260–270, 274–275, 283, 299, 382/254; 345/63, 611, 626, 660, 687, 690; 348/235, 241, 252, 533; 353/31; 375/240.19, 375/254

See application file for complete search history.

(56) References Cited

U.S. PATENT DOCUMENTS

| | | | | |
|---|---|---|---|---|
| 5,799,111 A * | 8/1998 | Guissin | | 382/254 |
| 7,164,397 B2 * | 1/2007 | Pettitt et al. | | 345/63 |
| 7,224,411 B2 * | 5/2007 | Gibbon et al. | | 348/757 |
| 7,265,784 B1 * | 9/2007 | Frank | | 348/241 |
| 7,280,705 B1 * | 10/2007 | Frank et al. | | 382/274 |
| 7,404,645 B2 * | 7/2008 | Margulis | | 353/31 |
| 7,483,058 B1 * | 1/2009 | Frank et al. | | 348/222.1 |
| 7,518,802 B2 * | 4/2009 | Kojima | | 359/634 |
| 7,768,496 B2 * | 8/2010 | Daly | | 345/102 |
| 2002/0118883 A1 * | 8/2002 | Bhatt | | 382/224 |
| 2005/0248592 A1 * | 11/2005 | Feng et al. | | 345/690 |

FOREIGN PATENT DOCUMENTS

| | | |
|---|---|---|
| EP | 1648155 A2 | 4/2006 |
| JP | H06-253147 | 9/1994 |
| JP | 2001-134226 | 5/2001 |
| JP | 2003-290170 | 10/2003 |
| WO | WO2005/101309 A1 | 10/2005 |
| WO | WO2006/010244 A1 | 2/2006 |

OTHER PUBLICATIONS

Rempel, Allan G., "Ldr2Hdr", ACM Transactions on Graphics, vol. 26, No. 3, Jul. 29, 2007.

Seetzen, H. et al., "High dynamic range display systems", Proceedings ACM Siggraph, Dec. 9, 2004.

* cited by examiner

*Primary Examiner* — Kanjibhai Patel

(57) ABSTRACT

Methods and apparatus according to various aspects take as input image data in a lower-dynamic-range (LDR) format and produce as output enhanced image data having a dynamic range greater than that of the input image data (i.e. higher-dynamic range (HDR) image data). In some embodiments, the methods are applied to video data and are performed in real-time (i.e. processing of video frames to enhance the dynamic range of the video frames is completed at least on average at the frame rate of the video signal).

54 Claims, 13 Drawing Sheets

US 8,233,738 B2

ENHANCING DYNAMIC RANGES OF IMAGES

REFERENCE TO RELATED APPLICATION

This application claims priority from U.S. patent application No. 60/962,708 filed 30 Jul. 2007 and entitled ENHANCING DYNAMIC RANGES OF IMAGES. This application claims the benefit under 35 U.S.C. §119 of U.S. patent application No. 60/962,708 filed 30 Jul. 2007 and entitled ENHANCING DYNAMIC RANGES OF IMAGES which is hereby incorporated herein by reference. This application is a continuation-in-part of U.S. patent application Ser. No. 12/182,121 filed 29 Jul. 2008 and entitled ENHANCING DYNAMIC RANGES OF IMAGES. This application claims the benefit under 35 U.S.C. §120 of U.S. patent application Ser. No. 12/182,121 filed 29 Jul. 2008 and entitled ENHANCING DYNAMIC RANGES OF IMAGES.

TECHNICAL FIELD

This invention relates to digital imaging. The invention relates specifically to apparatus and methods for enhancing the dynamic range of images (including still and/or video images). The invention may be embodied, without limitation, in electronic displays, media players (such as DVD players), image-processing sub-systems for use in electronic displays and/or media players and computer software provided on a medium which can be read and subsequently executed by a data processor.

BACKGROUND

The human eye is sensitive to light over a very wide range of intensities. It is desirable for images to have high dynamic ranges to accurately reproduce real scenes. High-performance image sensors, such as high-performance CCD arrays, are capable of acquiring images having high dynamic ranges. New generations of display devices promise to provide significantly improved dynamic range over conventional display technology.

Most existing movies, videos, and still images are recorded in formats that provide a dynamic range that is significantly lower than these new generations of display devices can produce. In the future, evolving camera technology and file formats will provide high fidelity content for these display devices. In the near term it would be desirable to provide a way to enhance the dynamic range of lower-dynamic-range media (e.g. image data in a lower-dynamic-range (LDR) format). This would permit viewers to enjoy at least some of the benefits of high-dynamic-range displays while enjoying existing media.

Viewers of theater imaging systems (projectors) and home-theater systems can be very discerning. In these and other applications, it would be desirable to provide images that are substantially free from noticeable artefacts.

In some applications it would be desirable to enhance the dynamic ranges of images (e.g. to produce an enhanced image signal) in real-time.

SUMMARY OF THE INVENTION

This invention has a number of aspects. One aspect provides methods which take as input image data in a lower-dynamic-range (LDR) format and produce as output enhanced image data having a dynamic range greater than that of the input image data. In some embodiments, the methods are applied to video data and are performed in real-time (i.e. processing of video frames to enhance the dynamic range of the video frames is completed at least on average at the frame rate of the video signal).

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
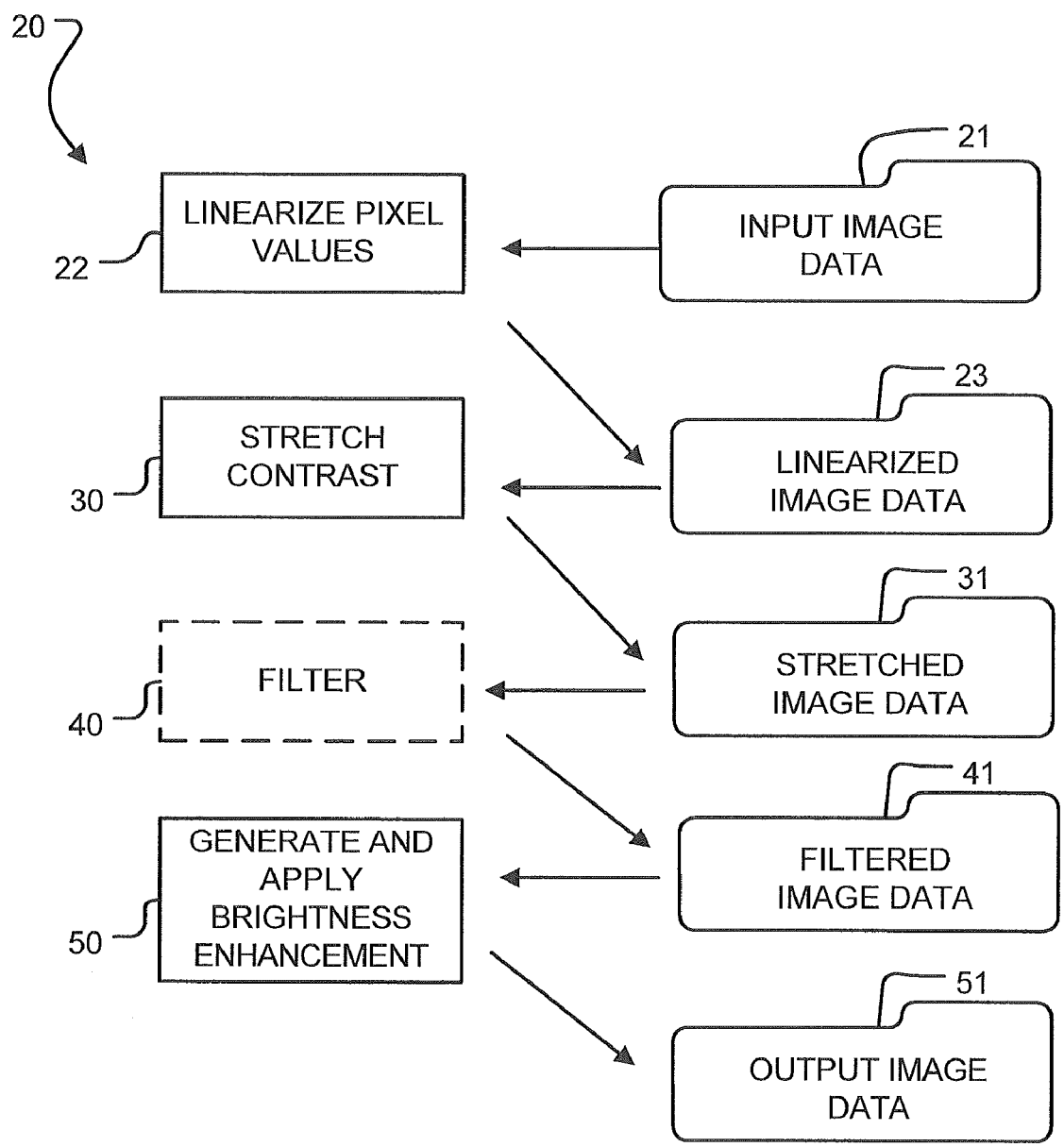
FIG. 1 is a flow diagram of a method for enhancing the dynamic range of an image according to one embodiment of the invention.

FIG. 1 is a flow chart illustrating a method 20 for enhancing dynamic range of a digital image defined by image data 21 according to one embodiment of the invention. Image data 21 may be lower-dynamic-range (LDR) image data. In block 22, pixel values from input image data 21 are linearized. Block 22 is not required in the case that the pixel values in input image data 21 are already represented in a space in which luminance varies linearly with pixel value. In some embodiments, the block 22 linearization can be avoided at the expense of additional down-stream processing. The output from block 22 is linearized image data 23. Each pixel in linearized image data 23 has a value or values at least approximately proportional to the luminance of the pixel.

The particular processing performed in the block 22 linearization will depend upon the encoding of the image in input image data 21. For example, typical image and television data is encoded with a gamma curve having a gamma value in a vicinity of 2.2. This gamma curve is intended to compensate for non-linearities in conventional display technologies, such as cathode ray tubes (CRTs). Linearization of such data can be achieved by applying a function that inverts the gamma curve. Inverting the gamma curve may provide pixel values that are approximately proportional to the luminance in the original scene.

The block 22 linearization function may be implemented using a lookup table (LUT). For example, the block 22 linearization procedure may involve looking up a pixel value for input image data 21, retrieving a corresponding linearized pixel value from a LUT and outputting the corresponding linearized pixel value to linearized image data 23. In other embodiments, the block 22 linearization function may be implemented by way of hardware or software executing on a suitable data processor that takes as input pixel values from input image data 21 and produces as output corresponding linearized pixel values for linearized image data 23.

In some embodiments, the block 22 linearization process comprises selecting one of a plurality of linearization functions that is most appropriate for linearizing input image data 21. Some data formats include information that explicitly or implicitly identifies a non-linear relationship between pixel values and luminance. Such information may be found in a header associated with input image data 21, for example.

Figure 1A:
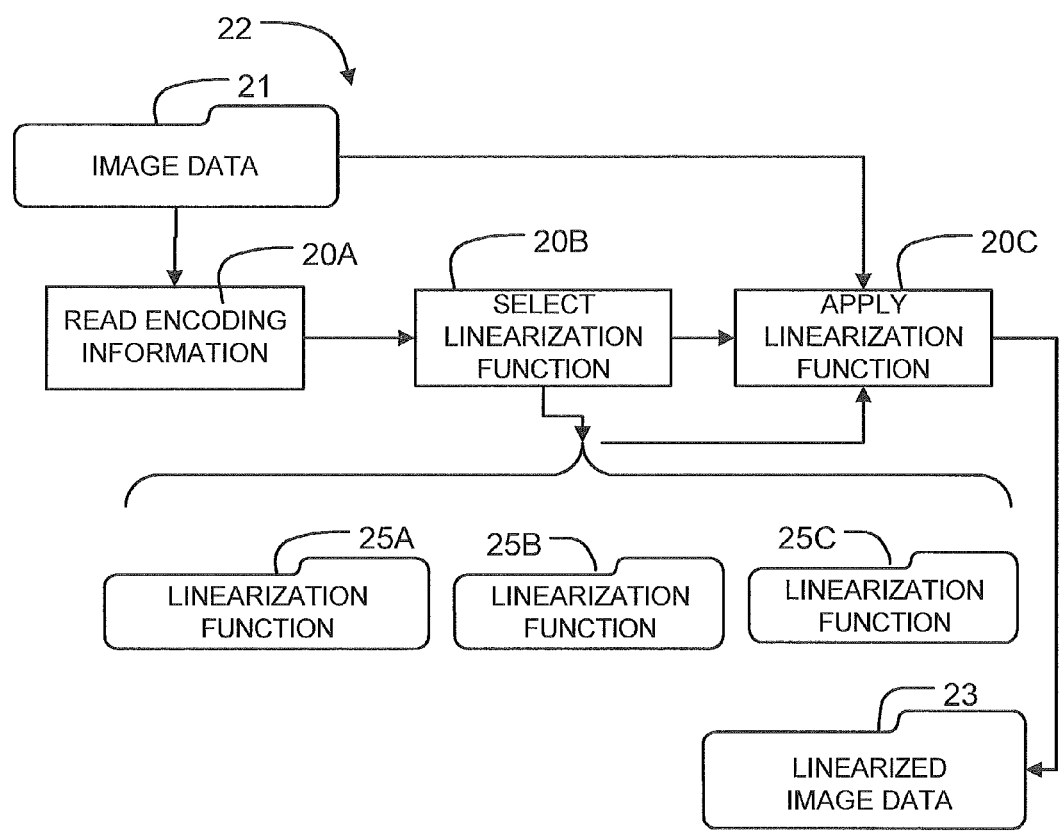
FIG. 1A is a flow diagram of a method for linearizing input image data according to one example embodiment.

FIG. 1A illustrates a method for implementing the block 22 linearization according to a specific embodiment, where input image data 21 includes encoding information which explicitly or implicitly identifies the non-linear relationship between pixel values of input image data 21 and the intended luminance. Referring to FIG. 1A, the block 22 linearization process may comprise: reading the encoding information (block 20A); selecting one of a plurality of linearization functions 25 (identified individually as 25A, 25B, 25C . . . ) that matches the encoding information (block 20B); and applying the selected linearization 25 to input image data 21 (block 20C) to generate linearized image data 23.

In some embodiments, the pixel values in linearized image data 23 comprise absolute output intensities to be displayed on a display for the corresponding pixels.

Referring back to FIG. 1, in block 30, the contrast of linearized image data 23 is stretched to produce stretched image data 31. The block 30 contrast stretching may be performed in a variety of ways. In one particular embodiment, the block 30 stretching is performed according to:

$$HDR_{ij} = \alpha + \beta \times LDR_{ij} \quad (1)$$

where $LDR_{ij}$ is a pixel value (indexed by the indicia i, j) from linearized image data 23, $HDR_{ij}$ is the corresponding pixel value (indexed by the indicia i, j) from stretched image data 31; α is a parameter that may be set equal to the black level of the display on which the image will be displayed; and β is a scaling factor. In some embodiments, α is less than 1 cd/m². In an example embodiment, α is in the range of 0.05 to 0.6 cd/m². In a specific example embodiment, α is 0.3 cd/m², which provides a deep black under normal viewing conditions. The scaling factor β may be chosen to produce a desired contrast ratio that is not so high that the resulting image will have an unnatural appearance (e.g. artefacts). It has been found that stretching the contrast by up to about 5000:1 (i.e. β up to about 5000) can be performed on a wide variety of images without introducing unacceptable artefacts. This threshold is conservative. For many images, much larger scaling factors β can be used to produce outstanding results. However, above this threshold, some images may suffer from degradations in visual quality.

The scaling factor β may be set with reference to the white level of a display on which an image will be displayed. For example, β may be chosen so that saturated pixel values in linearized image data 23 are mapped to an intensity value corresponding to a white point. The white point may, for example, be in excess of 1000 cd/m². In a prototype embodiment, the white point was chosen to be about 1200 cd/m². Values of α and β may be chosen to suit any target display. The values for α and β may be set independently of any characteristics of the image represented by linearized image data 23.

In optional block 40 (FIG. 1), an image filter is applied to stretched image data 31 to provide filtered/stretched image data 41. The optional block 40 filtering may reduce noise and quantization artefacts. The contrast stretching (block 30) and non-linear mapping (block 22) of pixel values can amplify quantization artefacts and noise. LDR input images are usually quantized to 256 pixel values, while over 1000 different values are typically used to cover the dynamic range of HDR displays at the precision of Just Noticeable Difference (JND) steps. Lossy video compression can further reduce the number of available intensity levels in a local image region. The optional block 40 filtering process can utilize unused intensity levels to smooth out artefacts which might otherwise be created by this amplification of quantization artefacts.

In some embodiments, block 40 comprises applying a bilateral filter to stretched image data 31. A suitable bilateral filter is described in Tomasi and Manduchi 1998, *Bilateral filtering for gray and color images*, In Proc. of ICCV '98, 839. In general, a bilateral filter may have the form:

$$h(x) = A(x) \int_{\xi \in N(x)} f(\xi) c(\xi - x) s(f(\xi) - f(x)) d\xi \quad (2)$$

where h(x) is the output of the filter for the pixel at location x; A(x) is a normalization factor, f(x) is the pixel value at location x; c(ξ−x) is a weighting function that drops off with the distance between the pixel at location ξ and the pixel at location x (c may be called a 'closeness' function); and s(f(ξ)−f(x)) is a weighting function that drops off with the difference between f(x) and f(ξ) (s may be called a 'similarity' function). The equation (2) integral may be evaluated over a neighbourhood N(x) of the location x.

Where the bilateral filter is given by equation (2), the normalization function A(x) may be given by:

$$A(x) = \frac{1}{\int_{\xi \in N(x)} c(\xi - x) s(f(\xi) - f(x)) d\xi} \quad (3)$$

In some embodiments, the closeness function (c) and the similarity function (s) are Gaussian functions of their respective arguments. For example, c may be given by:

$$c(\xi - x) = e^{-\frac{1}{2}\left(\frac{d(\xi-x)}{\sigma_d}\right)} \quad (4)$$

where $d(\xi-x)$ is the Euclidean distance between $\xi$ and x and $\sigma_d$ is a parameter defining the variance (i.e. how quickly c falls off with increasing distance between $\xi$ and x). The similarity function (s) may be given by:

$$s(f(\xi) - f(x)) = e^{-\frac{1}{2}\left(\frac{\delta(f(\xi)-f(x))}{\sigma_r}\right)} \quad (5)$$

where $\delta$ is a suitable measure of the distance in intensity space between the pixel values at locations $\xi$ and x and or $\sigma_r$ is a parameter defining the variance (i.e. how quickly s falls off with increasing difference between $f(\xi)$ and $f(x)$).

In some embodiments, a modified function is used for the similarity function (s), such that the variance $\sigma_r$ of the similarity function (s) increases with the value of f(x). In such embodiments, it may be desirable to stretch the variance $\sigma_r$ in proportion to the stretch introduced by the non-linear intensity mapping for the local pixel value in block 30 such that, after the block 30 stretching, the photometric variance $\sigma_r$ is equal to a fixed number, preferably two, of quantization levels.

The effect of making $\sigma_r$ vary with f(x) as described above is similar to performing a bilateral filter with fixed variance prior to the block 30 stretching. However, performing the block 40 bilateral filter after the block 30 stretching can be advantageous because after the block 30 stretching, the block 40 bilateral filter may be performed in fixed point arithmetic. Since performing bilateral filtering can be computationally expensive, where computational resources are limited, it is desirable to operate the bilateral filter on relatively small neighbourhoods N(x) of each pixel. For example, in some embodiments, the block 40 bilateral filter may be performed on neighbourhoods that include only pixels within four or so pixel spaces of the current pixel.

In a LDR representation of an image, it is typical that pixels in the brightest regions of the image are clipped (e.g. where pixel values in a LDR image are integers in the range of 0 to 255 (corresponding to an eight bit representation), the pixels in the brightest areas of the image may have pixel values clipped at 255). Since 255 is the maximum possible pixel value, the LDR image lacks information regarding how much brighter the original scene was than the minimum threshold for producing a pixel value of 255. In enhancing the dynamic range of an image, it may be desirable to boost values of clipped pixels over and above the contrast stretching performed in block 30.

In addition, to obtain the best HDR image based upon a LDR image, it can be desirable to boost values of the brightest pixels even when those pixel values are not clipped. For example, it can be desirable to boost values for pixels having values at or in excess of a white level of the LDR image. In these regions, information may have been lost because the scene intensity exceeded the capabilities of the camera, recording medium, or image data format.

Referring back to FIG. 1, block 50 generates and applies to filtered image data 41 (or to stretched image data 31 if no filtering is provided between blocks 30 and 50) a brightness enhancement function. An output image 51 is generated as a result of applying the block 50 brightness enhancement function. The block 50 brightness enhancement function increases the luminance of output image 51 especially in regions where pixel values for at least one color channel exceed a threshold in filtered image data 41. Such regions are referred to as 'enhancement regions' herein.

The block 50 brightness enhancement function attempts to modify the filtered image data 41 to provide an output image 51 that will provide a visceral response in the viewer approximating that associated with viewing the original scene. This is possible even though it is not possible to exactly replace the information that was lost from the original scene when generating input image data 21.

Figure 2:
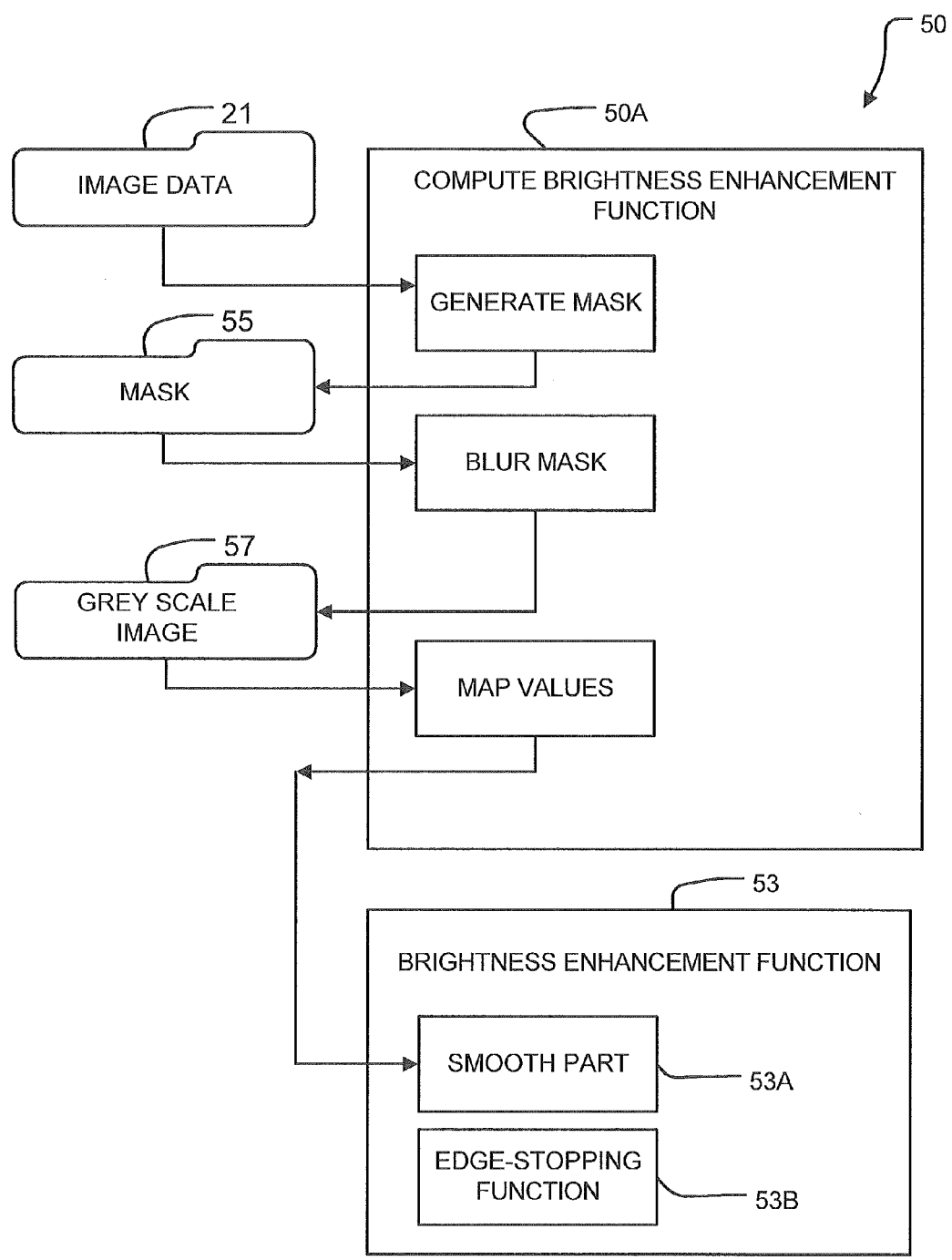
FIG. 2 is a flow chart which illustrates an example method for generating and applying a brightness enhancement function to image data.

FIG. 2 depicts a method for implementing the block 50 brightness enhancement function according to a particular embodiment of the invention. As shown in FIG. 2, block 50 may comprise computing, in block 50A, a brightness enhancement function 53 that can be applied to filtered image data 41 to yield output image data 51. As described below, brightness enhancement function 53 should have the characteristic that it avoids introducing noticeable spatial or temporal artefacts that would significantly degrade output image data 51. The fidelity required in output image data 51 will vary depending upon its application. In the following example, brightness enhancement function 53 generates values that are used to multiply pixel values in filtered image data 41 to produce output image data 51. In other embodiments, brightness enhancement function 53 may be applied to filtered image data 41 using techniques other than multiplication.

Brightness enhancement function 53 is primarily smoothly varying and has an influence that extends past edges of any enhancement regions in filtered image data 41. The result is an increase in brightness not just for pixels in filtered image data 41 with color channels which exceed the threshold value (or other luminance measure which satisfies a criterion for inclusion in an enhancement region), but for a region surrounding such pixels. As described below, brightness enhancement function 53 may contain sharp edges in areas of strong image gradients in filtered image data 41. In some embodiments, brightness enhancement function 53 is generated by combining a smoothly-varying component 53A and an edge-stopping component 53B. As explained in more detail below, edge-stopping component 53B may identify locations of sharp gradients in filtered image data 41.

The smoothly varying component 53A of brightness enhancement function 53 may be determined based upon a map that identifies pixels in filtered data 41 having values that exceed the threshold value (or which otherwise satisfy criteria for inclusion in an enhancement region). It is convenient to create a binary mask 55 in which pixels where at least one color channel exceeds the threshold intensity value (or pixels for which some other luminance measure satisfies a criterion for inclusion in an enhancement region) have one value (for example "1") and all other pixels have another value (for example "0"). Where the image data is in a representation which provides a single luminance value, or equivalent, then the binary mask 55 may be made by setting pixels for which the luminance exceeds a threshold value to one value (for example "1") and other pixels to another value (for example "0").

In general, it is desirable to set the threshold value for inclusion of pixels in an enhancement region to be somewhat lower than the clipping value (i.e. the greatest value permitted in input image data 21). Some video formats typically use a white level of 235, meaning that full white of reflective objects corresponds to a pixel value of 235 in each color channel. Typical video streams also contain larger, 'supersaturated' pixel values corresponding to specular highlights or light sources. Lossy video compression can alter pixel values by a few steps either way. It has been found that when treating input image data 21 in an RGB format with each color channel having pixel values in the range of 0 to 255, using a threshold value of 230 works well for separating enhancement regions from other regions in the presence of lossy video compression. It is desirable that the threshold be equal to or lower than the white point of the image in question. For typical photographs, it has been found that a threshold of 254 is adequate in the presence of artefacts introduced by lossy compression.

The methods described herein are not very sensitive to the particular threshold chosen to distinguish between pixels that are merely bright or saturated and those that should be boosted in the HDR image. The threshold value may be varied somewhat without detracting significantly from the appearance of the output image. It is not mandatory to apply a sharp or fixed threshold.

Where pixel values are specified in an RGB or similar format in which luminance information is specified separately for a plurality of color channels, it is convenient and practical but not mandatory that the same threshold be applied for each color channel. Acceptable results could be obtained by applying one threshold (for example, 229) to one color channel and another threshold (for example, 231) to one or more other color channels.

Smoothly varying component 53A of brightness enhancement function 53 may be generated from binary mask 55 by blurring mask 55 with a large kernel of Gaussian or approximately Gaussian shape. The result is a grey-scale image 57 having a value for each pixel. The values of grey-scale image 57 are largest in regions which correspond to central portions of enhancement regions in filtered image data 41 and the values fall off smoothly in moving away from the central portions of such enhancement regions. The values in grey-scale image 57 can then be mapped into a range of 1 to a, where a is a multiplication factor which may be used to yield smoothly-varying brightness enhancement component 53A. The mapping of the values of grey-scale image 57 to the range 1 to a may be linear.

The blur kernel used to generate grey-scale image 57 is advantageously large enough that, under expected viewing conditions, the spatial spectrum of the blur filter used to blur binary mask 55 contains primarily angular frequencies small enough that they do not stand out to the human visual system. For example, the angular frequencies may be 1 cycle per degree or less, preferably 0.5 cycles per degree or less. The human visual system is not very sensitive to changes in brightness that occur at such low spatial frequencies.

The standard deviation of the blur filter in terms of spacing between pixels may depend upon the display dimensions and anticipated range of viewing distances. For example, on a 37 inch (diagonal) display with a resolution of 1920×1080 pixels, a prototype embodiment applies a blur filter having a standard deviation of 150 pixels. This corresponds to 1.2 degrees at a viewing distance of 3 m. The standard deviation of the blur filter may correspond to at least 0.75 degrees, preferably at least 1 degree, more preferably at least 1.1 degree. As a result, the spatial spectrum of the blur filter will contain primarily low angular frequencies and will not contain high angular frequencies that could result in visually disturbing artefacts.

Most computer monitors are intended to be viewed at a distance of approximately 0.5 meters. Such a monitor having a width of 30 cm spans a viewing angle of approximately 30 degrees. The recommended viewing angle for television screens in home theatre systems is also typically in the range of 30 to 36 degrees. Where the intended viewing angle is 30 degrees, a standard deviation equal to 0.025 of the horizontal resolution of the display will span about 0.75 degrees and a standard deviation equal to 0.05 of the horizontal resolution of the display will span about 1.5 degrees.

Where the methods described herein are being applied to generate an image to be displayed on a television, then it may be desirable that the standard deviation of the blur filter be at least about 0.025 of the horizontal resolution of the display and more advantageously at least about 0.033 (where 'about' means±15%) of the horizontal resolution of the display. For example, for a display having a horizontal resolution of 1920 pixels, the standard deviation of the blur filter is advantageously at least about 50 pixels, and more advantageously at least about 65 pixels. As noted above, good results on a display of this horizontal resolution have been achieved with a standard deviation of 150 pixels.

The value of the brightness amplification factor a may be chosen based on the capabilities of the target display. The brightness amplification factor a should not be so large that it generates output values that are significantly greater than the outputs of which the display is capable. In a prototype embodiment, a value of a=4 corresponding to a peak intensity of 4×1200=4800 cd/m$^2$ was found to produce good results on a Brightside™ model DR37 display. Due to the large blur radius, the peak intensity is only reached in large enhancement regions. Higher or lower values of the brightness amplification factor a may also be used. For some images, values of a of up to 32 or so may be applied without introducing significant artefacts. Where the method will be applied to a wide range of images without adjustment, a more conservative value of a, such as a value in the range of 2 to 9 or 10 is preferable. In some embodiments, a may be in a range of 3 to 12.

The smooth component 53A of brightness enhancement function 53, applied to filtered image data 41 by itself stretches the global contrast, and yields images that appear more crisp than stretched image data 31 when viewed on an HDR display. However, smooth component 53A does not enhance local contrast around sharp edges. To further improve appearance under such conditions, brightness enhancement function 53 may be provided with an edge-stopping component 53B. Edge-stopping component 53B of brightness enhancement function 53 limits the influence of smooth component 53A in image regions that are separated from an enhancement area by sharp edges.

Edge-stopping component 53B may comprise a binary mask that has pixel values indicating whether or not smooth component 53A should be applied to the pixel. Edge-stopping component 53B and smooth component 53A may be combined by identifying those pixels of smooth component 53A that correspond to pixels of edge-stopping function 53B having values that indicate that smooth component 53A should not be applied. The values for the pixels in smooth component 53A so identified can be set to 1 (so that they do not affect the corresponding values in filtered image 41).

Figure 2A:
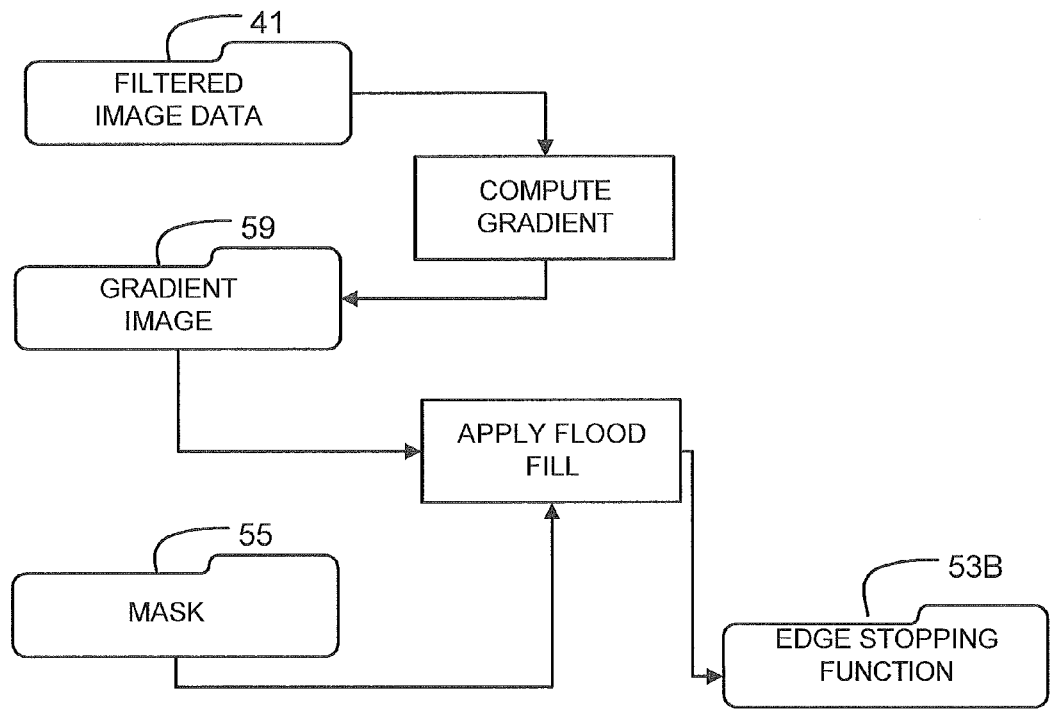
FIG. 2A is a flow chart which illustrates an example method for generating a mask constituting an edge-stopping function.

FIG. 2A shows a method for generating a mask constituting edge-stopping function 53B based upon mask 55 and a gradient image 59. Gradient image 59 may be generated from filtered image data 41 and may be in the form of a binary mask having pixel values indicating whether or not the gradient at each pixel of filtered data 41 exceeds a threshold value.

Edge-stopping function 53B may then be generated by applying a flood fill algorithm using binary mask 55 as a seed and allowing the flood fill to proceed outward from the enhancement regions only until the flood fill reaches pixels in gradient image 59 corresponding to pixels with a large gradient magnitude (e.g. over the threshold) or the boundary of the area of influence for smooth component 53A.

Figure 2B:
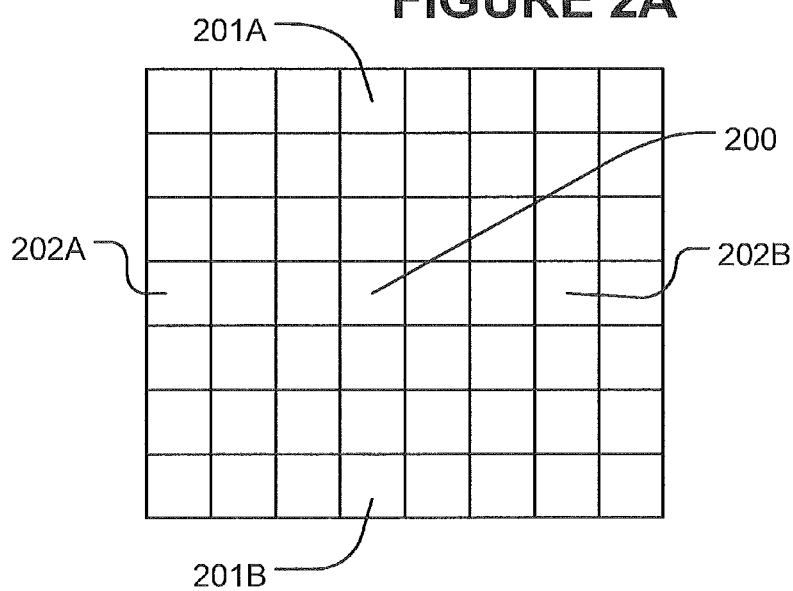
FIG. 2B is a diagram illustrating a neighbourhood of a pixel and an exemplary method for determining a gradient at the pixel.

Gradients may be computed for gradient image 59 using the method of divided differences. For example, the gradient at pixel 200 in FIG. 2B may be determined by computing differences between vertically neighbouring pixels 201A and 201B and horizontally neighbouring pixels 202A and 202B. In an example embodiment, the gradient is calculated according to:

$$G=|A-B|^2+|C-D|^2 \qquad (6)$$

Where G is the gradient, A is the pixel value of pixel 201A, B is the pixel value of pixel 201B, C is the pixel value of pixel 202A and D is the pixel value of pixel 202B. For robustness it is desirable to use a wide baseline of a few pixels (i.e. 201A and 201B are a few pixels apart and 202A and 202B are a few pixels apart). In the embodiment illustrated in FIG. 2B, the baseline is 5 pixels. This has been found to help provide thick edges in the gradient image 59 that reliably prevent the flood fill algorithm from leaking across the edges.

It may, in some embodiments, be desirable to further process edge-stopping component 53B with a morphological 'OPEN' operator (usually symbolized by 'o') and to slightly blur the result to suppress aliasing. The OPEN operator (not explicitly shown in FIG. 2A) may smooth contours and break narrow isthmuses. The OPEN operator may operate by eroding all edges by one pixel and then adding pixels adjacent to any edges in the resulting image. The further processed edge-stopping component 53B can then be combined with the smooth component 53A as described above to yield brightness enhancement function 53. The resulting brightness enhancement function 53 can be multiplied onto filtered image data 41 to yield output image data 51.

Figure 3A:
FIGS. 3A, 3B, 3C and 3D respectively show: an example LDR input image, a corresponding smooth component, a corresponding brightness enhancement function that has been modified by an edge-stopping component, and a higher-dynamic-range (HDR) output image. It will be noted that the medium of a patent drawing does not reproduce the dynamic ranges of the input and output images.
Figure 3B:
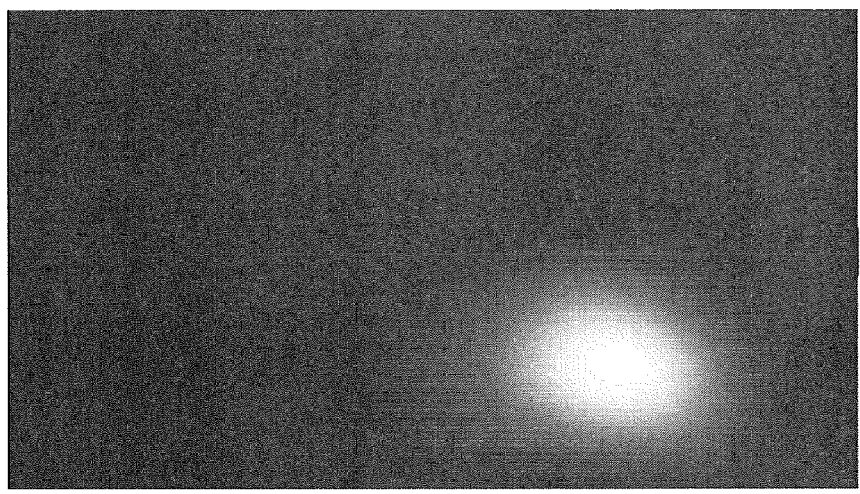
Figure 3C:
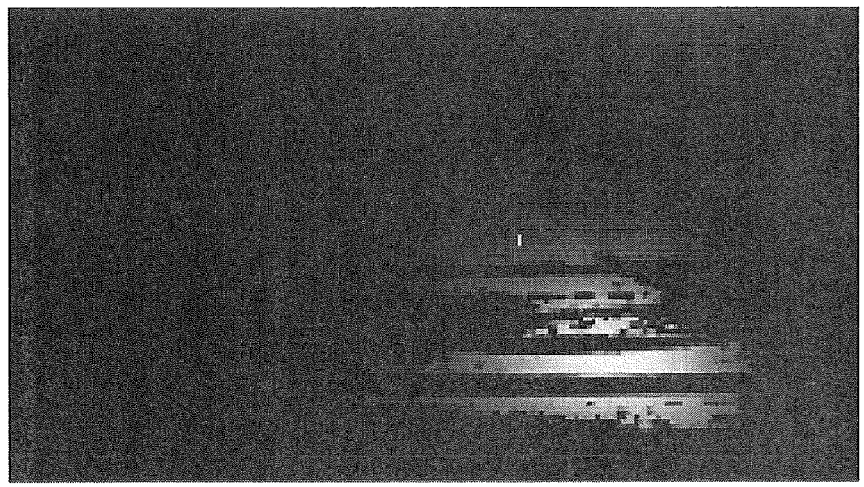
Figure 3D:
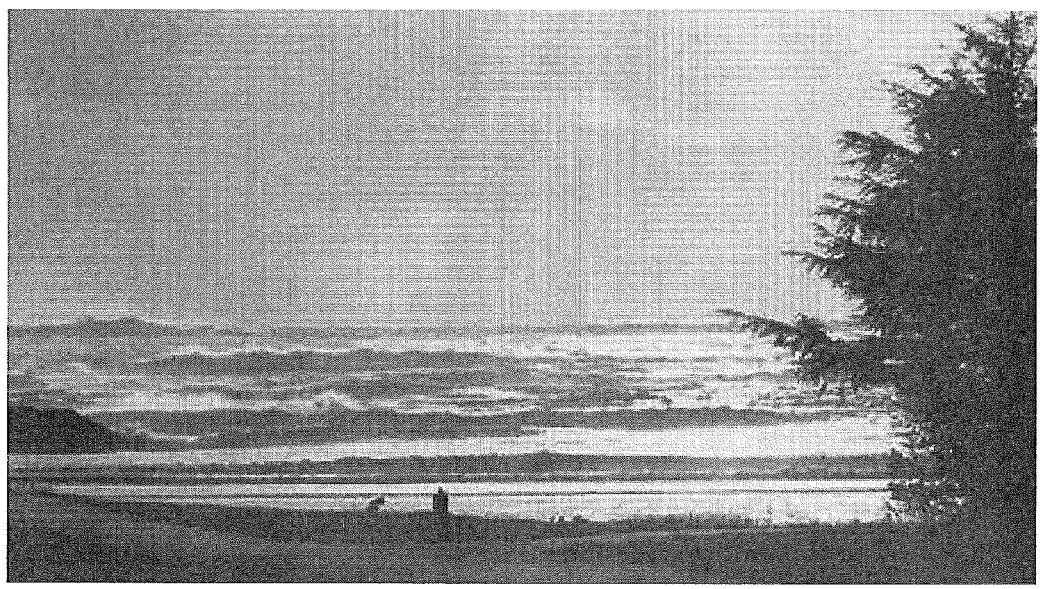

FIGS. 3A, 3B and 3C respectively show: an example LDR input image 60; a corresponding smooth component 53A; and a corresponding brightness enhancement function 53 that has been modified by combining smooth component 53A with an edge-stopping component 53B.

Figure 4A:
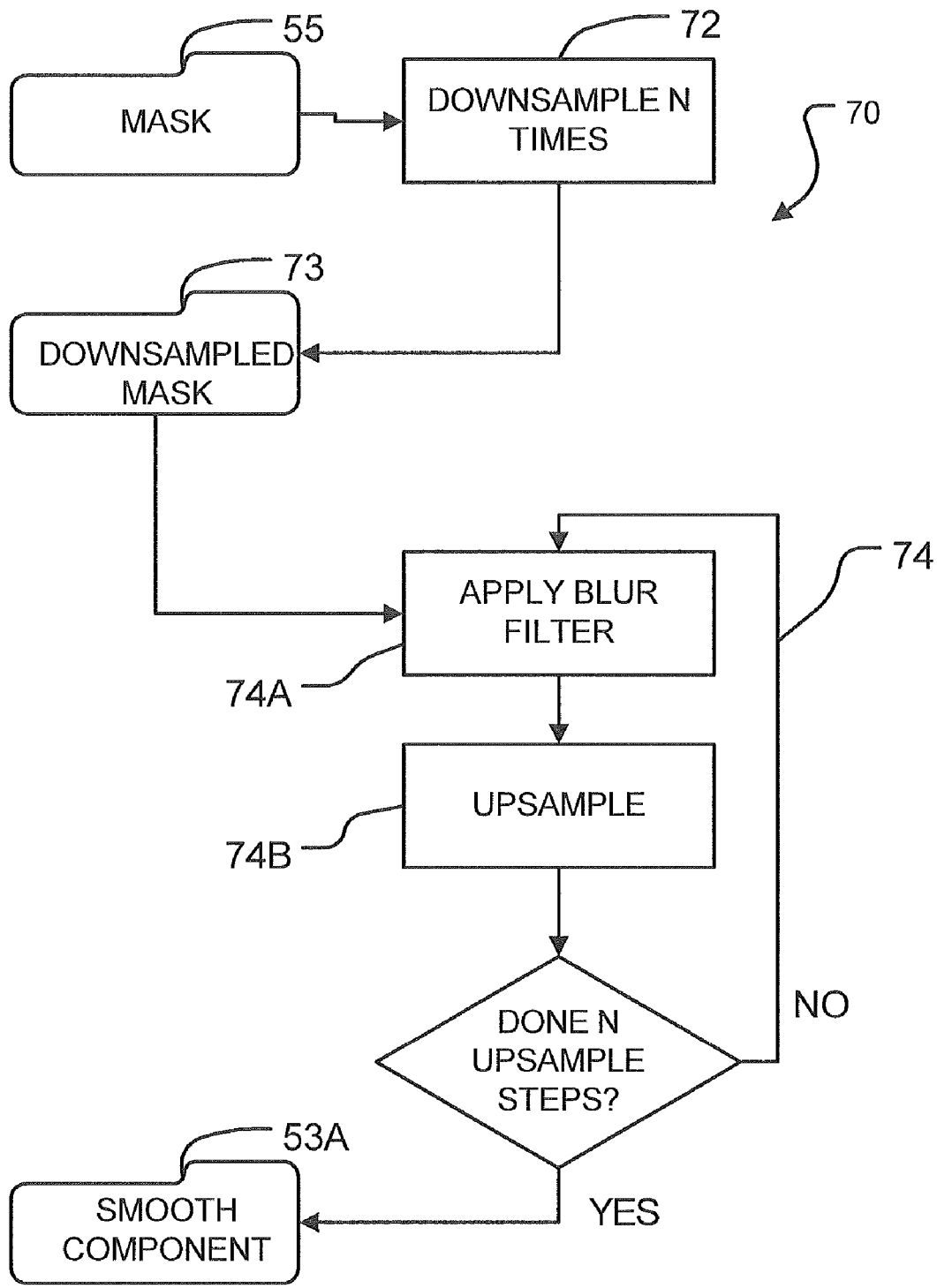
FIG. 4A is a flow chart illustrating an example method for generating a smooth component for a brightness enhancement function.
Figure 4B:
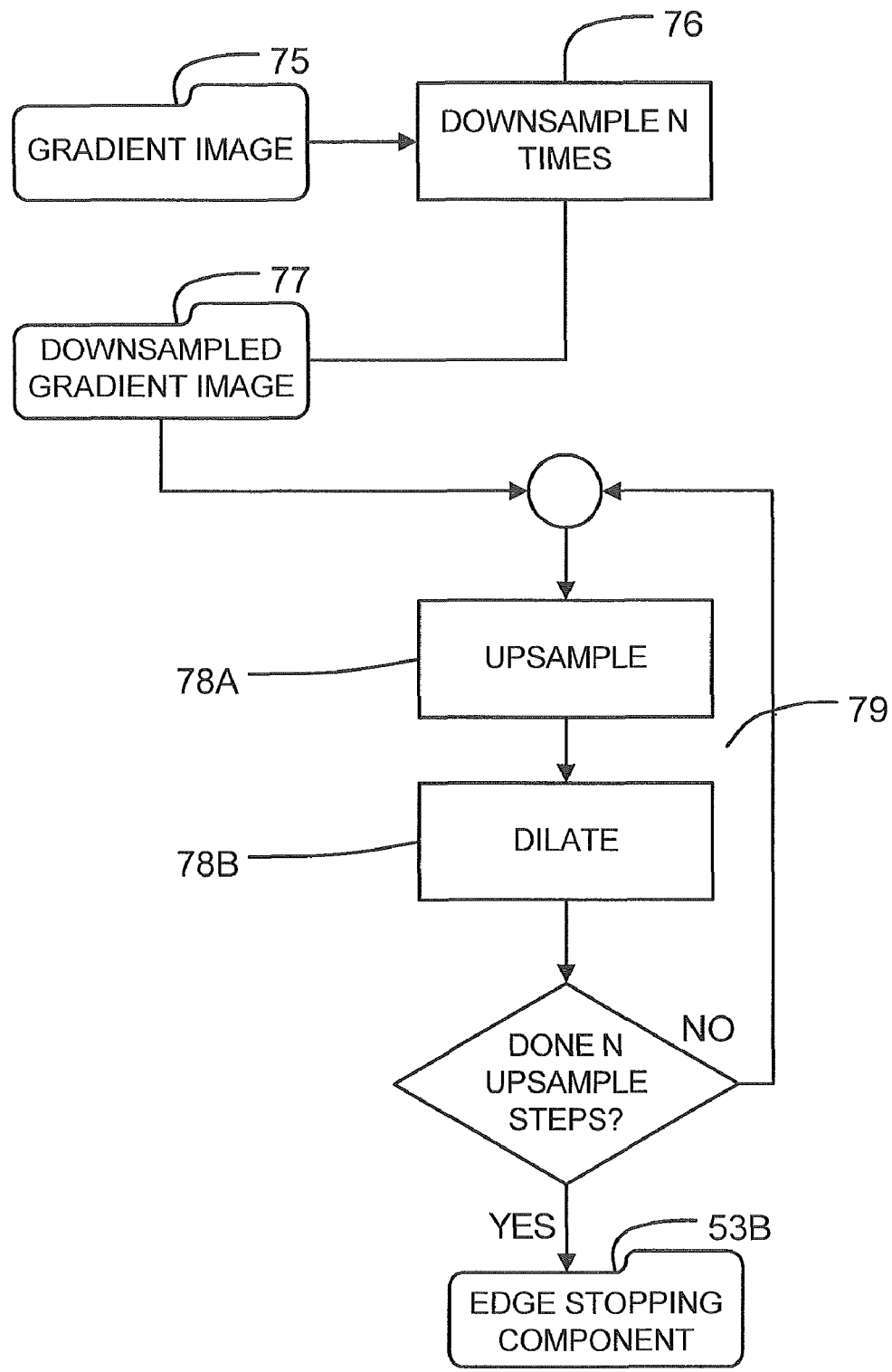
FIG. 4B is a flow chart illustrating an example method for generating an edge-stopping component for a brightness enhancement function.

One computationally efficient way to generate smooth component 53A and edge-stopping component 53B involves down-sampling and up-sampling image data as shown in FIGS. 4A and 4B, which respectively depict a method 70 for generating smooth component 53A and a method 71 for generating edge-stopping component 53B of a brightness enhancement function 53 according to particular embodiments of the invention. Smooth component 53A may be generated by method 70 of FIG. 4A. Method 70 starts with mask 55. Mask 55 may be similar to mask 55 (FIG. 2) described above and may be obtained in a process similar to that described above. In block 72, mask 55 is down-sampled N times to obtain a down-sampled mask 73. Each of the N block 72 down-sampling steps may reduce the number of pixels by a suitable factor in each dimension. It is convenient in some embodiments to down-sample in such a way that the number of pixels in each dimension is reduced by a factor of two (the total number of pixels is reduced by a factor of four) in each of the N block 72 down-sampling steps.

In the illustrated embodiment, smooth component 53A is then obtained from down-sampled mask 73 via loop 74. Loop 74 comprises N iterations, with each iteration involving: application of a blur filter in block 74A (which may comprise applying a Gaussian blur having a small kernel—e.g. a Gaussian blur applied to a 3×3 pixel neighbourhood of each pixel); and then up-sampling the result in block 74B (which may involve nearest-neighbour interpolation). This technique may be described as an image pyramid technique. The use of image pyramids is described in Burt P. and Adelson E., 1983, *The Laplacian pyramid as a compact image code*, IEEE Trans. on Communication 31, 4, 532-540. The result of method 70 is smooth component 53A.

In some embodiments, edge stopping component 53B may be generated using method 71 shown in FIG. 4B by starting with a gradient image 75 representing the gradient of filtered image 41. In block 76, gradient image 75 is down-sampled N times to yield a down-sampled gradient image 77. Edge stopping function 53B may then be obtained from down-sampled mask 73 in loop 79 by N times, upsampling the downsampled mask using nearest-neighbour interpolation (block 78A) and applying a morphological 'DILATION' operation to the result (block 78B). The DILATION operation (usually symbolized by '⊕') is performed on small (e.g. 3×3 pixel) blocks (i.e. using a 3×3 square structuring element) and is modified to stop at pixels that correspond to an edge (e.g. are marked as having a high gradient in the edge image of the corresponding resolution).

Figure 4C:
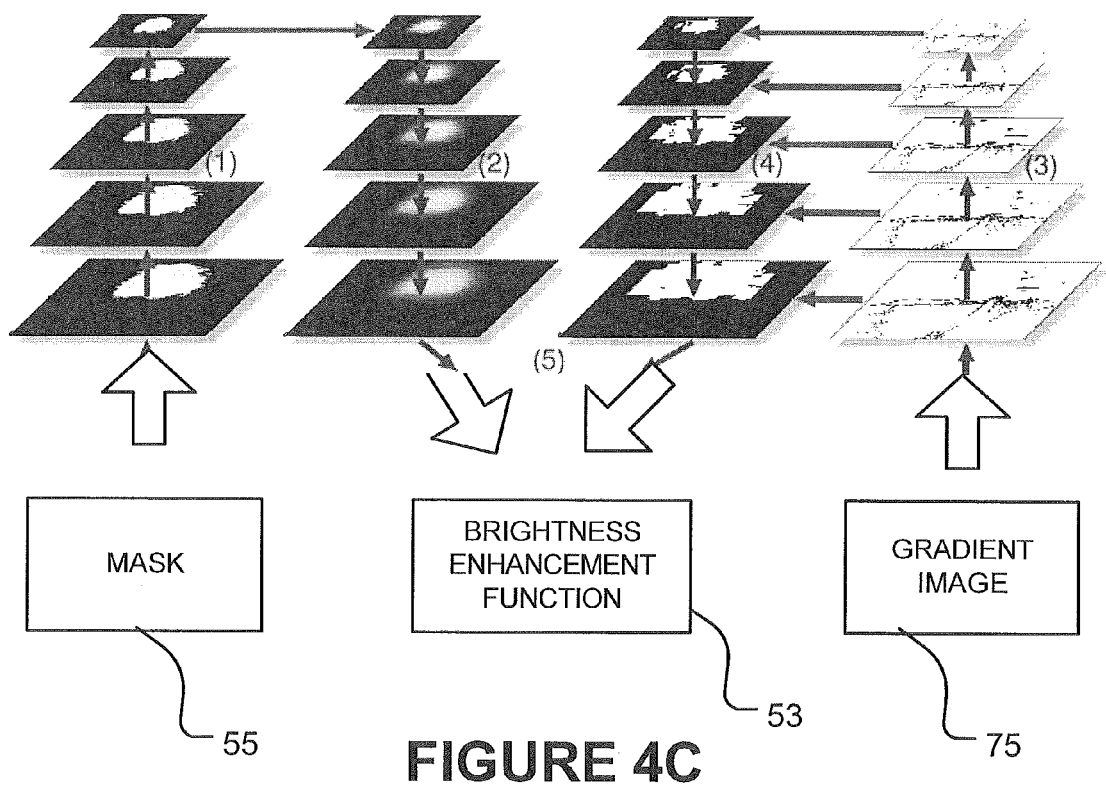
FIG. 4C illustrates image pyramids that may be used in the generation of a brightness enhancement function by the methods of FIGS. 4A and 4B, for example.
Figure 4D:
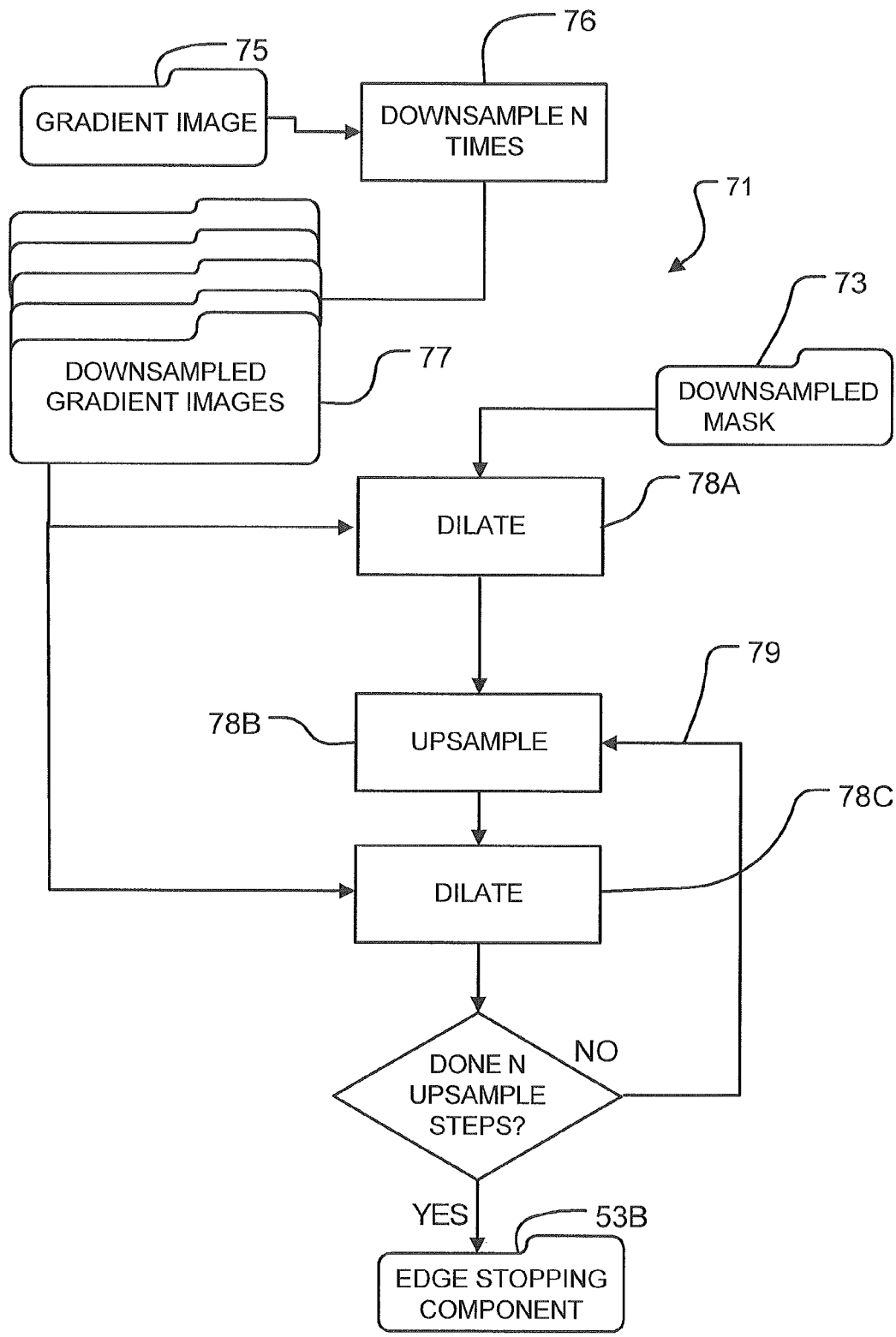
FIG. 4D further illustrates the concepts of FIG. 4B and particularly those related to generating the edge-stopping component.

FIG. 4D further illustrates these concepts and particularly those related to generating edge-stopping component 53B. As illustrated, method 71 starts with a gradient image 75 representing the gradient of filtered image 41. Gradients for gradient image data 75 may be determined using a similar process (e.g. divided differences) to that described above for gradient image data 59. Method 71 also starts with down-sampled mask 73 (FIG. 4A) which may be obtained in a manner similar to that described above. In block 76, gradient image 75 is down-sampled N times to yield a set of N down-sampled gradient images 77, each of the N down-sampled gradient images 77 having a corresponding resolution. Down-sampled mask 73 and one of down-sampled gradient images 77 are then provided to morphological DILATE operation (block 78A). The block 78A DILATION operation (usually symbolized by '⊕') may be performed on small (e.g. 3×3 pixel) blocks (i.e. using a 3×3 square structuring element) of down-sampled mask 73. The block 78A DILATION operation may be provided with the one of down-sampled gradient images 77 having a resolution the same as, or similar to, that of down-sampled mask 73. The block 78A DILATION operation may be modified to stop at pixels that correspond to an edge (e.g. pixels determined or otherwise marked as having a high gradient in the corresponding equivalent-resolution one of down-sampled gradient images 77).

The result of the block 78A DILATION operation is provided to loop 79 which is used to obtain edge-stopping function 53B. Loop 79 comprises N iterations, with each iteration involving: up-sampling (in block 78B) the result of the previous loop 79 iteration (or the result of the block 78A DILATION operation in the case of the initial loop 79 iteration); and applying a morphological 'DILATION' operation (in block 78C) to the up-sampled result of block 78B. The block 78B up-sampling procedure may comprise nearest-neighbour interpolation. The block 78C DILATION operation may be similar to that of block 78A described above, except that the block 78C DILATION operation may take as input the one of down-sampled gradient images 77 having a resolution the same as, or similar to, that of the output of the block 78B up-sampling process and the block 78C DILATION operation may be modified to stop at pixels that correspond to an edge (e.g. pixels determined or otherwise marked as having a high gradient in the corresponding equivalent-resolution one of down-sampled gradient images 77). In the illustrated embodiment, at the conclusion of loop 79, there will have been N up-sample operations and N+1 DILATE operations. In other embodiments, the initial block 78A dilation operation is not necessary—i.e. there may be N up-sample operations and N+1 DILATE operations. The output of loop 79 is edge-stopping component 53B.

Advantageously, the radius (block size) on which the DILATION operation (blocks 78A, 78C) works may be the same as the radius on which the block 74A blur operation (FIG. 4A) is performed. This causes the boundaries of the regions affected by the blur operator (block 74A) and the DILATION operators (blocks 78A, 78C) to propagate outwardly at the same rate over sequential up-sampling iterations.

FIG. 4C shows down-sampled images and gradient images providing image pyramids that may be applied in the course of performing methods 70, 71 of FIGS. 4A, 4B. In particular: column (1) of FIG. 4C illustrates the block 72 down-sampling operation (FIG. 4A); column (2) of FIG. 4C illustrates the block 74A blurring and block 74A up-sampling operations of loop 74 (FIG. 4A); column (3) of FIG. 4C illustrates the block 76 down-sampling of gradient image 75 to obtain the set of down-sampled gradient images 77 (FIG. 4B); and column (4) of FIG. 4C illustrates the blocks 78A, 78C DILATION and block 78B up-sampling operations of loop 79 (FIG. 4B).

The example methods described herein may be implemented in a manner that provides advantageous characteristics which may include one or more of the following:

- The methods may be implemented as algorithms for execution by graphical processor units ('GPUs');
- The methods may be implemented as algorithms which may be executed by signal processors, application-specific integrated circuits (ASICs) or field programmable gate arrays ('FPGAs'), which may be located in displays, media players or the like.
- The methods are efficient enough to be performed in real-time on dynamic HDTV resolution video streams.
- User input is not required. All parameters can be chosen in advance based on hardware characteristics of the display on which the images will be displayed.
- The methods can be robust in the sense that they avoid producing disturbing artefacts. The visual quality of the HDR output image can be at least as good as that of the input image for a very large range of content.
- The output video stream can be temporally coherent (so that colors and intensities do not change abruptly unless they do so in the input image).

Figure 5:
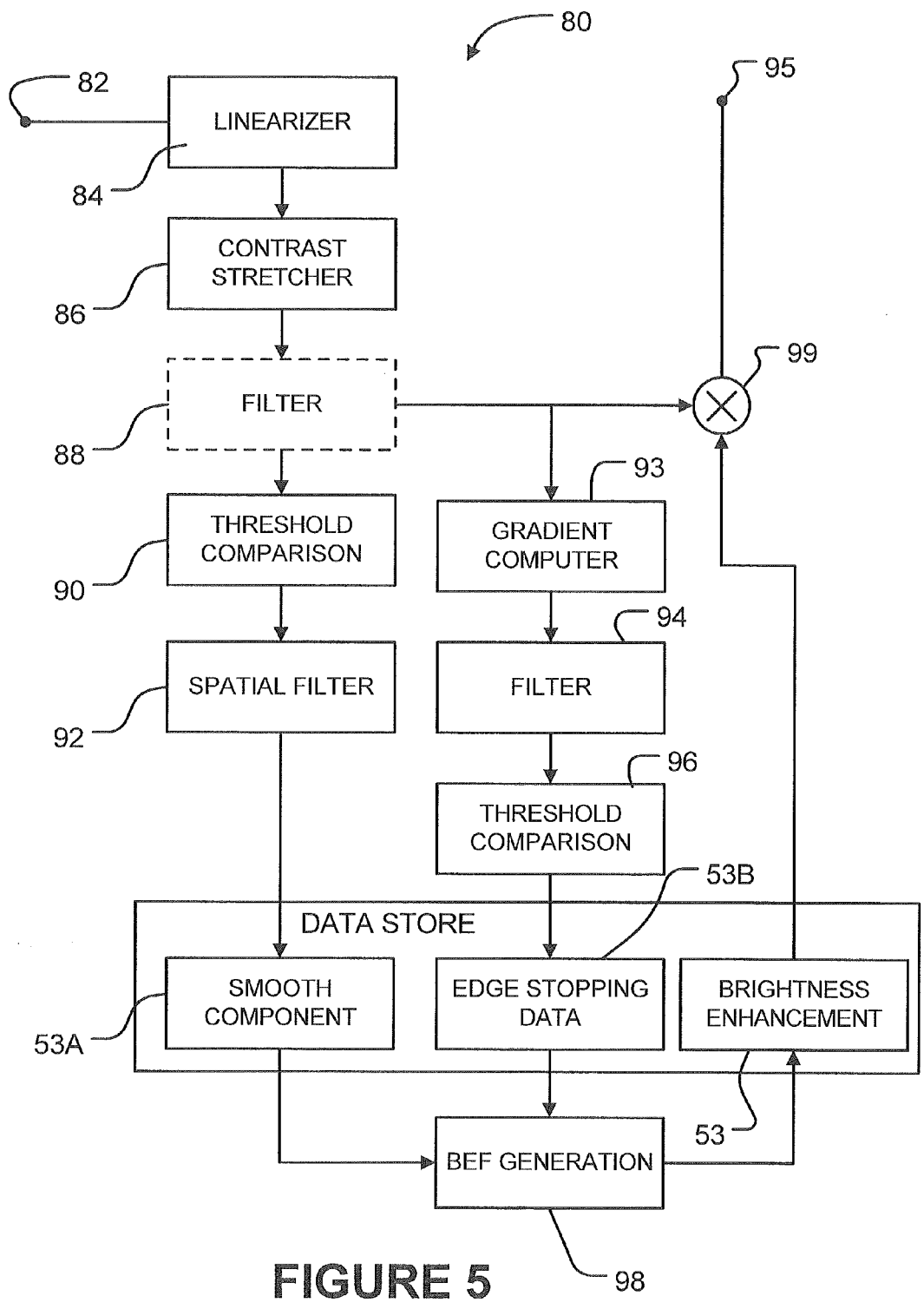
FIG. 5 illustrates apparatus according to an embodiment of the invention.

FIG. 5 shows an apparatus 80 according to an exemplary embodiment of the invention. Apparatus 80 comprises an input 82 which receives input image data 21 (FIG. 1). The image data is passed in series through a linearizer 84, a contrast stretcher 86 and an optional filter 88. The output of filter 88 is passed to a threshold comparison system 90 and a spatial filter 92 to produce data defining a smooth component 53A. Spatial filter 92 may perform the operations of method 70 (FIG. 4A), for example. The output of filter 88 is also passed in sequence through a gradient computer 93, a filter 94 and a threshold comparison system 96 to yield an edge-stopping component 53B. The data defining smooth component 53A and edge-stopping component 53B are provided to a brightness-enhancement generator component 98 that generates a brightness enhancement function 53. Brightness-enhancement function 53 and the output of filter 88 are provided to multiplier 99 which, in the illustrated embodiment, multiplies (e.g. pixel-wise multiplication) the output of filter 88 and brightness enhancement function 53. In the illustrated embodiment, the output from multiplier 99 is provided to an output 95. In other embodiments, multiplier 99 may perform some other form of mapping or function (i.e. other than pixel-wise multiplication) which takes as input the output of filter 88 and brightness enhancement function 53 and outputs resulting data 95. In some embodiments, the output data at output 95 may be stored in a data store or may continue on a data path of a display which displays the output data. Apparatus 80 may process data received at input 82 in real time.

The elements illustrated in FIG. 5 may be implemented in any suitable manner. For example, these elements may comprise software executing on suitable data processors, fixed hardware circuits, configurable hardware, such as FPGAs or portions thereof configured to perform the required functions or the like.

Some HDR displays are of a type that have two modulators which may be referred to as dual-modulator HDR displays. A first modulator produces a light pattern and a second modulator modulates the light pattern produced by the first modulator to yield an image. The first modulator is driven to produce a comparatively low-resolution representation of an image. The low-resolution representation is modulated by the second modulator to provide a higher resolution image which can be viewed by an observer. The first modulator may comprise a matrix or array of actively modulated light sources, such as light emitting diodes (LEDs) or the like or, in the alternative, a modulator that modulates light emitted by a light source that is functionally separate from the modulator. The first modulator may be referred to as a light-emitting layer or a light source layer. The amount of light emitted as a function of location on the light-emitting layer may be controlled. The second modulator is a liquid crystal display (LCD) in some embodiments. Such dual-modulator HDR displays generate separate driving signals for the first and second modulators.

Some ways to generate driving signals for first and second modulators in dual-modulator displays are described in international application No. PCT/CA2005/000807 filed on 27 May 2005 and entitled RAPID IMAGE RENDERING ON DUAL-MODULATOR DISPLAYS. This application was published as WO 2006/010244 and is hereby incorporated by reference herein.

There is a synergy between the methods described above for enhancing dynamic range and the methods which may be applied to generate driving signals for the modulators in a dual-modulator display. In particular, certain intermediate results (e.g. various levels of down-sampled/up-sampled image data) are useful for both methods. In some embodiments the methods and apparatus described herein for enhancing dynamic range are combined with methods and apparatus for generating driving signals for a dual-modulator display. Advantageously, is such embodiments, data may be shared between the methods. This conserves hardware and/or computing resources. A particular saving results in some embodiments wherein certain down-sampled image data is used both for the purposes of enhancing dynamic range of an image and for generating appropriate driving signals (e.g. driving signals for one of the modulators) to cause a dual-modulator display to display the enhanced image. In some embodiments, apparatus according to the invention are incorporated into a video processor chip for use in a display or a display driver chip for use in a display.

Figure 6:
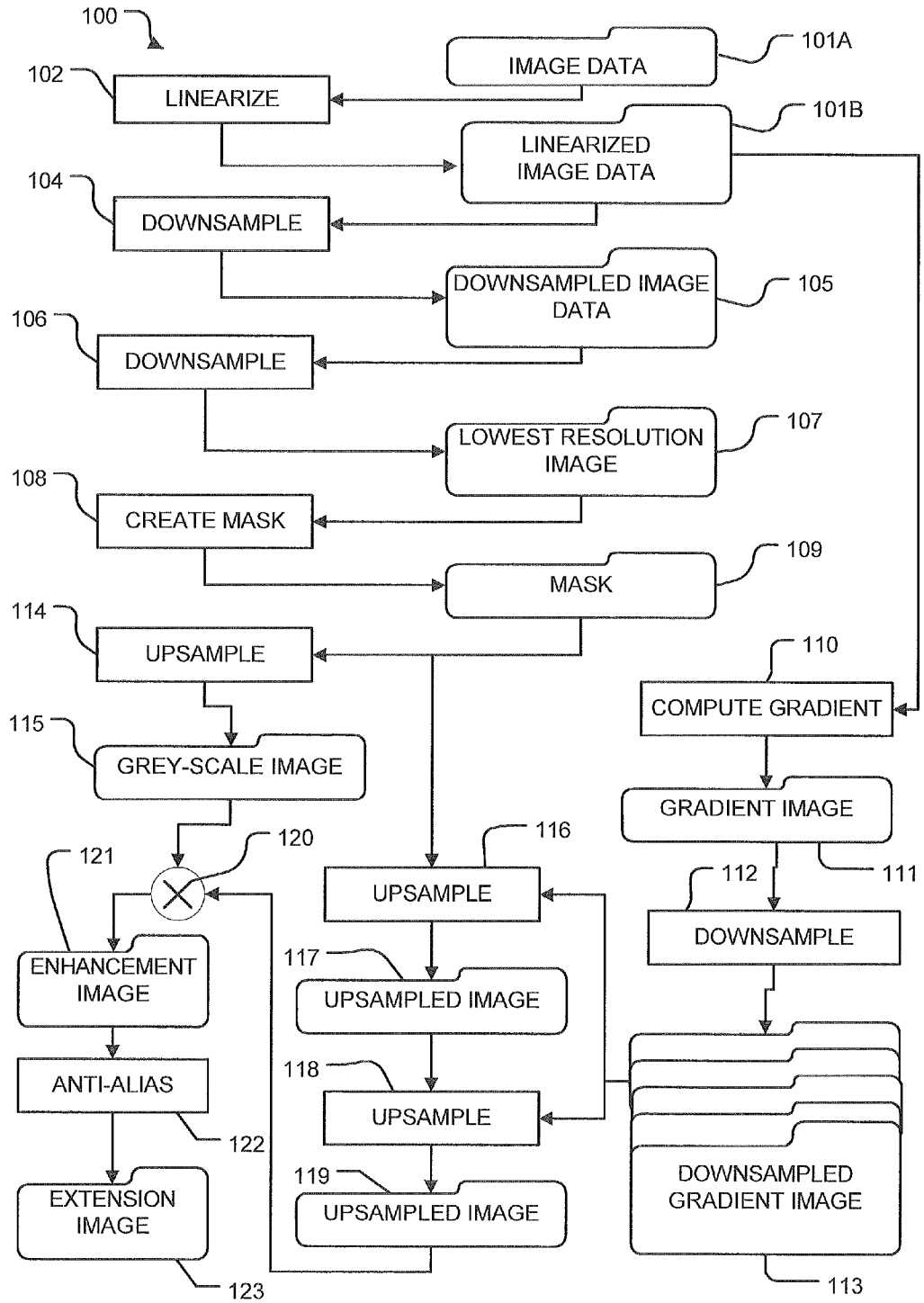
FIGS. 6 and 6A illustrate a method according to a particular embodiment for enhancing dynamic range of image data and generating driving values for modulators of a dual-modulator type display to display the enhanced image data.
Figure 6A:
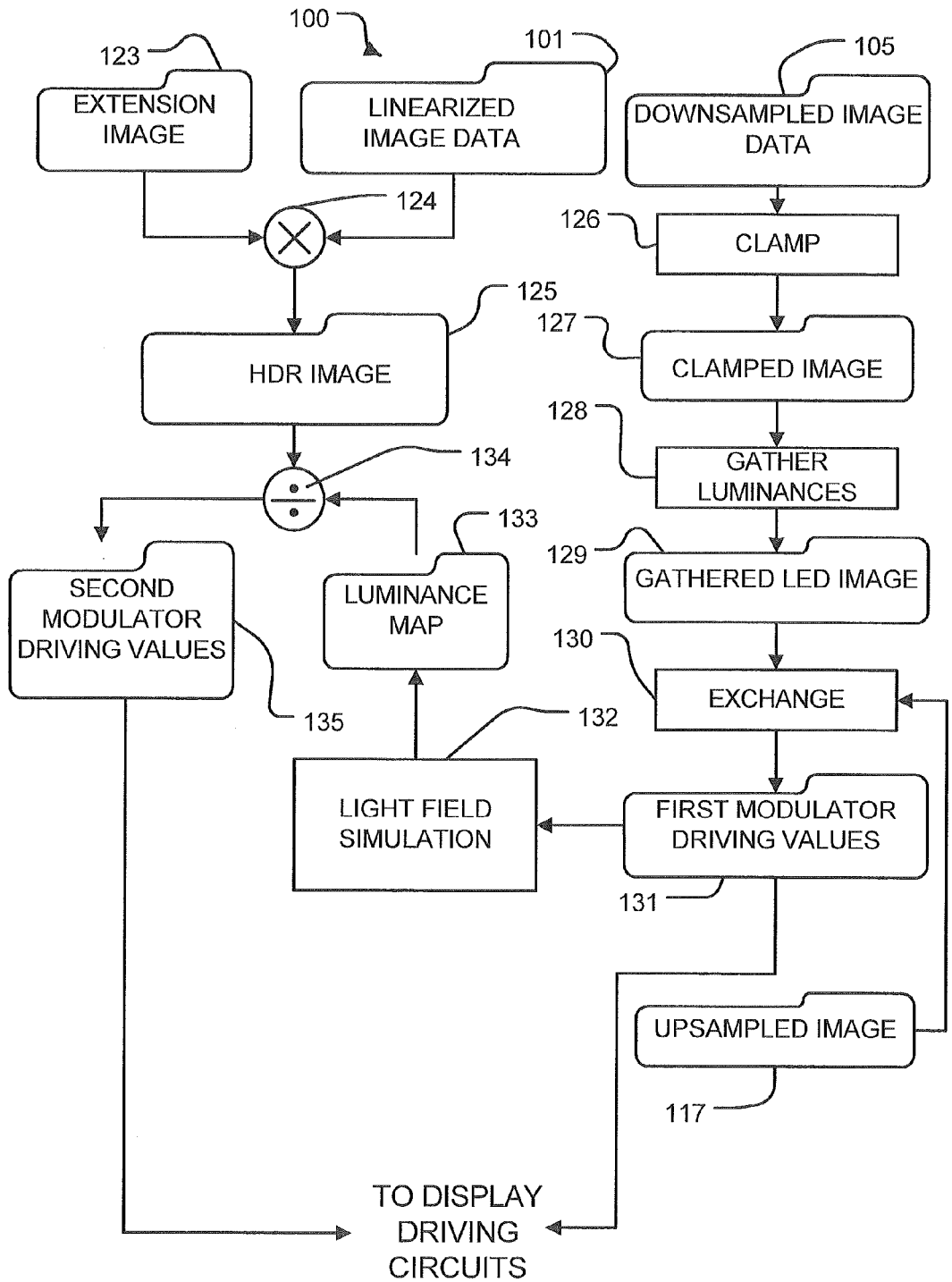

FIGS. 6 and 6A illustrate a method 100 for enhancing and displaying an image according to an example embodiment. Method 100 may be carried out in circuitry of a dual-modulator display, for example. In block 102, an initial LDR image 101A is linearized in intensity space to provide a linearized image 101B. Where initial LDR image 101A has been encoded with a gamma curve, block 102 may comprise gamma correcting the luminance values of LDR image 101A to obtain linearized image data 101B.

In block 104, linearized image 101B is down-sampled (e.g. to a resolution matching that of the elements of a light source layer (i.e. first modulator) of the dual-modulator display that is to be used to display the image) to produce down-sampled image data 105. The block 104 down-sampling may be performed in one or more stages. The light source layer may comprise, for example, a matrix of light sources such as light-emitting diodes (LEDs), an array of controllable pixels in a reflection-type or transmission-type modulator that regulates the transmission of light from a common light source or set of light sources, or the like. The resolution of down-sampled image 105 is typically greater than that of down-sampled gradient image 77 (see FIG. 4B) or than the lowest-resolution image 107 used for the purpose of dynamic range enhancement.

Down-sampled image 105 may be preserved (e.g. stored in a suitable memory or the like). In block 106, down-sampled image 105 is further down-sampled to yield lowest-resolution image 107. Lowest-resolution image 107 may have a resolution desired for generating a brightness enhancement function 53 (e.g. for performing methods 70, 71 of FIGS. 4A, 4B). The block 106 down-sampling may be performed in a series of down-sampling steps.

A mask 109 identifying enhancement regions is prepared in block 108. Block 108 may comprise comparing pixel values in lowest-resolution image 107 to one or more threshold values and generating a binarized mask 109, as described above, for example. Mask 109 (FIG. 6) may correspond to down-sampled mask 73 (FIGS. 4A, 4B) described above and may be generated in block 108 using a similar process to that described above. In some embodiments, a full resolution binarized mask (similar to mask 55 of FIGS. 2, 4A) may be generated directly from linearized image data 101B and then the full resolution binarized mask itself may be down-sampled to obtain mask 109.

In block 110, a gradient image 111 is computed from linearized image data 101B. Gradient image 111 (FIG. 6) may correspond to gradient image 75 (FIG. 4B) and may be computed in block 110 in a manner similar to that described above. In block 112, gradient image 111 is down-sampled to the same resolution as lowest-resolution image 107 and mask 109. In the illustrated embodiment, the block 112 down-sampling is performed in a series of down-sampling steps to yield a set of down-sampled gradient images 113 of different resolutions. The set of down-sampled gradient images 113 (FIG. 6) may correspond to the set of down-sampled gradient images 77 (FIG. 4B) and may be generated in block 112 in a manner similar to that described above.

In block 114, mask 109 is up-sampled a number of times to reach the resolution of linearized image 101B. As explained above in loop 74 (FIG. 4A), a Gaussian blur (block 74A of FIG. 4A) may be applied before each block 114 up-sampling step. The result of the block 114 up-sampling is a grey-scale image 115. Grey-scale image 115 may correspond grey-scale image 57 (FIG. 2) and/or to smooth component 53A (FIG. 2, FIG. 4A) of the brightness enhancement function.

In block 116, mask 109 is up-sampled to the same resolution as down-sampled image 105. The result of the block 116 up-sampling operation is preserved (e.g. stored in a suitable memory or the like) as up-sampled image 117. As explained above in method 71 (FIG. 4B), a DILATION operation (blocks 78A, 78C of FIG. 4B) may be applied during each block 116 up-sampling step. As discussed above in relation to the DILATION operations of blocks 78A, 78C, at each block 116 up-sampling step, the gradient image 113 of the corresponding resolution may be used as an edge stop (e.g. to limit the extent of the DILATION operation and/or the corresponding extent of the brightness enhancement function). For example, pixels corresponding to high-gradient pixels in the corresponding gradient image 113 may be set to a value that will result in the brightness enhancement function affecting those pixels to a lesser degree or not at all).

In block 118 up-sampled image 117 is further up-sampled to the resolution of linearized image 101B. The result of the block 118 up-sampling is up-sampled image 119. Although not explicitly shown in FIG. 6, the block 118 up-sampling procedure may also involve a DILATION operation similar to that of blocks 78A, 78C (FIG. 4B). Again, at each block 118 up-sampling step, the gradient image 113 of the corresponding resolution may be used as an edge stop (e.g. to limit the extent of the DILATION operation and/or the corresponding extent of the brightness enhancement function). Up-sampled image 119 may correspond to edge-stop component 53B (FIG. 4B) of the brightness enhancement function.

In block 120, grey-scale image 115 is multiplied (e.g. by pixel-wise multiplication) with up-sampled image 119 to yield enhancement image 121. In other embodiment, block 120 may comprise some other mapping which takes as input grey-scale image 115 and up-sampled image 119 and outputs enhancement image 121. In block 122, an anti alias filter is applied to enhancement image 121 to yield a saturation extension image 123. In other embodiments, block 122 may involve other techniques for antialiasing or otherwise removing or reducing aliasing from enhancement image 121 to yield extension image 123. Extension image 123 may correspond to the brightness enhancement function 53 (FIG. 2) described above.

In block 124 (FIG. 6A), saturation extension image 123 is multiplied (e.g. pixel-wise multiplication) with linearized image data 101B to yield a HDR image 125. In some embodiments, block 124 may involve a mapping (e.g. to values 1-a) prior to carrying out the multiplication. In other embodiments, block 124 may comprise some other mapping which takes as input saturation extension image 123 and linearized image data 101B and outputs HDR image 125.

In the illustrated embodiment of method 100, a control signal 131 for a light-emitting layer (e.g. the first modulator of a dual-modulator display) is generated in blocks 126 through 130. In block 126, the luminance of down-sampled image 105 is clamped, so that the luminance does not exceed a threshold value (e.g. the threshold value could be related to a maximum luminance that a LED of the light-emitting layer is capable of emitting). Block 126 yields clamped image 127.

In block 128, a luminance gathering step is performed on clamped image 127 to yield gathered LED image 129. In some embodiments, block 128 may comprise applying a blur filter to clamped image 127. Block 128 is useful in the case where light source elements of the first modulator are laid out in a pattern that is different from a grid used in image processing. For example, LEDs or other light sources of a first modulator in a display device may be arranged in a hexagonal grid but the image processing steps of method 100 may be performed on a square or rectangular grid (for the convenience of the image processing algorithm and/or hardware). In such a case, some rectangular grid elements may not correspond to LED(s) or other light-emitting element(s) of the first modulator. A blur filtering operation may be performed in block 128 to spread the intensity to neighboring elements that do correspond to LED(s) or other light-emitting element(s) of the first modulator.

In block 130, an exchange is performed on gathered LED image 129 to yield first modulator driving values 131. The block 130 exchange operation may increase the intensity of light delivered by the first modulator to areas of the second modulator that correspond to enhancement regions. Together, the block 130 exchange operation and the block 132 light field simulation may attempt to compensate for potential overlapping effect of multiple LEDs in the first modulator. The block 130 exchange operation may receive up-sampled image 117 as input. The intensity of light at a location on the second modulator can be increased by increasing the output of light sources of the first modulator surrounding the light source that corresponds to the location. As discussed below, the pixel values for the second modulator are set based upon a light field simulation (block 132). The block 132 light field simulation takes into account the light that will be produced by the first modulator when it is driven by driving values 131. In this manner, the block 132 light field simulation prevents areas surrounding locations at which the intensity of the light pattern produced by the first modulator has been increased from being unduly bright in the image seen by a viewer.

In the illustrated embodiment, the block 132 light field simulation is performed using first modulator driving values 131 as inputs. First modulator driving values 131 generated by exchange operation 130 take into account gathered LED image 129 and up-sampled image 117. In other embodiments, the block 132 light field simulation may optionally receive gathered LED image 129 and/or up-sampled image 117. Up-sampled image 117 may provide information regarding the dynamic range enhancement to be applied to elements of the light source layer. The block 132 light field simulation yields a luminance map 133. Luminance map 133 estimates the luminance of light incident at the pixels of the second modulator that will result when driving values 131 corresponding to gathered LED image 129 as modified by up-sampled image 117 are applied to drive the light source layer (first modulator).

In block 134, HDR image 125 is divided by luminance map 133 to yield driving values 135 for the elements of the second modulator. In some embodiments, the block 134 division operation may comprise pixel-wise division. In other embodiments, block 134 may comprise some other form of mapping which takes as input HDR image data 125 and luminance map 133 and generates therefrom second modulator driving values 135. Block 134 may also involve adjusting the image values for the response function (gamma) of the second modulator.

The display will display a rendering of HDR image 125 when the first modulator is driven according to driving values 131 and the second modulator is driven according to driving values 135.

In some embodiments, first modulator driving values 131 are sent downstream to display driving circuitry in a 'spare' scanline of an image format containing second modulator driving values 135. The driving circuitry extracts first modulator driving values 131 from the spare scanline and applies first modulator driving values 131 to drive the first modulator. This is often practical since the first modulator typically has far fewer elements than the second modulator and the data format may have the capacity to carry one or more scan lines not required by the second modulator. For example, a first modulator may be made up of a number of LEDs that is less than a number of pixels on one scan line of the second modulator. In this case, all of the first modulator driving values 131 for the LEDs can be contained in a single scan line of the data format that is not needed to carry driving values 135 for pixels of the second modulator.

A display or a component within a display may be configured to perform method 100 of FIGS. 6, 6A on incoming image data. In some embodiments, the method includes determining whether or not incoming image data requires dynamic range enhancement. If no dynamic range enhancement is required (for example, in a case where the incoming image data defines a high dynamic range image in a suitable HDR data format) then the display switches to a mode in which dynamic range enhancement is turned off. The steps of method 100 (FIGS. 6, 6A) may be performed in one or more data processors, such as graphics processors, digital signal processors or microprocessors, for example, and/or by hardware subsystems such as suitably configured ASICS, FPGAs, logic circuits and the like. In some embodiments, the steps of method 100 (FIGS. 6, 6A) are performed on frames of a sequence of video frames in real time (i.e. at least on average at the frame rate of the video signal).

Certain implementations of the invention comprise computer processors which execute software instructions which cause the processors to perform a method of the invention. For example, one or more processors in a display or display controller or media player may implement the methods of FIGS. 1, 1A, 2, 2A, 4A, 6 and/or 6A by executing software instructions in a program memory accessible to the processors. The invention may also be provided in the form of a program product. The program product may comprise any medium which carries a set of computer-readable data comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable data on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- In the example methods described above, brightness enhancement function 53 is applied (e.g. in block 50) after contrast has been stretched (e.g. in block 30). This ordering is not mandatory. In alternative embodiments, a brightness enhancement function could be applied prior to stretching the contrast.
- The methods described herein are facilitated by operating in a representation wherein pixel values vary linearly with luminance. This is convenient but not mandatory. The methods described herein could be performed, with appropriate modifications, in a non-linear space.
- In some applications it is practical to provide an option to permit a human user to fine tune one or more parameters affecting the enhancement of dynamic range so as to achieve a HDR image having a desired appearance. Embodiments for such applications may comprise a user interface which provides access to the parameters. A user can then chose desired values for the parameters and view an image created from a source image by the application of methods as described herein which use those parameters. Any parameters may be made user-adjustable. Some non-limiting examples of parameters that may be user-adjustable are: parameters defining a linearization function; thresholds for identifying enhancement regions; parameters specifying dark and white points; parameters specifying an amount of contrast stretching to be applied globally; parameters relating to the size of the area affected by the brightness enhancement function; parameters related to the maximum value of the brightness enhancement function, and the like.

This application and the accompanying claims may make reference to lower-dynamic-range or LDR image data and higher-dynamic-range (HDR) image data. These references should be understood to be relative to one another. That is, LDR data should be understood to have a dynamic range less than that of HDR data and vice versa. However, except where otherwise stated, there is no limitation on the absolute dynamic range of either LDR or HDR data.

Accordingly, the scope of the invention is to be construed in accordance with the substance defined by the following claims.

What is claimed is:

1. A method for enhancing lower-dynamic range (LDR) image data representing an image, the method comprising:
   identifying at least one enhancement region within the image;
   generating a brightness enhancement function, wherein generating the brightness enhancement function comprises:
   generating a mask which identifies pixels inside and outside of the enhancement region;
   applying a blur filter to the mask to obtain grey-scale image data;
   applying the brightness enhancement function to the LDR image data to generate higher-dynamic range (HDR) image data, wherein compared to the LDR image data, the HDR image data comprises increased luminance values of enhancement-region pixels in the enhancement region and increased luminance values of one or more boundary-region pixels outside of the enhancement region, the luminance value increase of the boundary-region pixels decreasing with distance from the enhancement region.

2. A method according to claim 1 wherein identifying the at least one enhancement region within the image comprises evaluating luminance values of pixels in the LDR image data using an enhancement criterion.

3. A method according to claim 2 wherein the enhancement criterion comprises a luminance value threshold above which pixels are identified to be in the enhancement region and below which pixels are identified to be outside of the enhancement region.

4. A method according to claim 1 wherein the blur filter comprises a smoothly varying function.

5. A method according to claim 4 wherein the smoothly varying function comprises at least one of: a Gaussian shape; and an approximately Gaussian shape.

6. A method according to claim 1 wherein a spatial angular frequency of the blur filter is less than or equal to 1 cycle per degree.

7. A method according to claim 1 wherein a standard deviation of the blur filter is at least about 0.025 of a horizontal resolution of a display on which the HDR image data is to be displayed.

8. A method according to claim 1 comprising mapping the grey-scale image data to provide a smooth component of the brightness enhancement function, the smooth component having a range of 1-a, where a is a brightness amplification parameter greater than 1.

9. A method according to claim 8 wherein the brightness amplification parameter is in a range of 2 to 10.

10. A method according to claim 8 wherein applying the brightness enhancement function to the LDR image data comprises pixel-wise multiplication of the smooth component with the LDR image data.

11. A method according to claim 8 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

12. A method according to claim 11 wherein applying the brightness enhancement function to the LDR image data comprises applying the smooth component to the LDR image data only for pixels where the edge-stopping component indicates that application of the brightness enhancement function should increase the luminance of the pixels.

13. A method according to claim 12 wherein applying the smooth component to the LDR image data only for pixels where the edge-stopping component indicates that application of the brightness enhancement function should increase the luminance of the pixels comprises pixel-wise multiplication of the smooth component with the LDR image data.

14. A method according to claim 1 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

15. A method according to claim 14 comprising determining the gradient image of the LDR image data using a method of divided differences.

16. A method according to claim 14 comprising determining the gradient image of the LDR image data by computing differences between vertically neighbouring pixels and horizontally neighbouring pixels.

17. A method according to claim 16 wherein the vertically neighbouring pixels and horizontally neighbouring pixels are spaced apart from one another by a baseline of two or more pixels.

18. A method according to claim 14 wherein generating the edge-stopping component comprises determining whether the gradient image of the LDR image data are greater than a threshold.

19. A method according to claim 18 wherein generating the edge-stopping component comprises performing a flood fill operation using the mask as a seed and allowing the flood fill to proceed outward from the enhancement region unit the flood fill reaches pixels for which the gradient image are greater than the threshold.

20. A method according to claim 19 wherein generating the edge-stopping component comprises applying a morphological OPEN operator to a result of the flood fill operation.

21. A method according to claim 1 comprising generating the brightness enhancement function, wherein generating the brightness enhancement function comprises:

generating a mask which identifies pixels inside and outside of the enhancement region;
down-sampling the mask to obtain a down-sampled mask;
for each iteration in a loop comprising N iterations:
applying a blur filter to the down-sampled mask in an initial iteration and to a result of the previous iteration in other iterations; and
up-sampling a result of the blur filter by an up-sampling step;
wherein a result of the $N^{th}$ iteration of the loop comprises grey-scale image data having the same resolution as the LDR image data.

22. A method according to claim 21 comprising mapping the grey-scale image data to provide a smooth component of the brightness enhancement function, the smooth component having a range of 1-a, where a is a brightness amplification parameter greater than 1.

23. A method according to claim 22 wherein applying the brightness enhancement function to the LDR image data comprises pixel-wise multiplication of the smooth component with the LDR image data.

24. A method according to claim 22 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

25. A method according to claim 24 wherein generating the edge-stopping component comprises:
down-sampling the gradient image of the LDR image data in a series of N down-sampling steps to obtain a set of N down-sampled gradient images;
for each iteration in a loop comprising N iterations:
performing a DILATION operation to the down-sampled mask in an initial iteration and to a result of the previous iteration in other iterations; and
up-sampling a result of the DILATION operation by an up-sampling step.

26. A method according to claim 25 comprising, for each DILATION operation:
identifying one of the set of N down-sampled gradient images having a resolution corresponding to that of a current subject of the DILATION operation; and
stopping the DILATION operation at pixels in the one of the set of N down-sampled gradient images having gradients greater than a threshold.

27. A method according to claim 25 wherein applying the brightness enhancement function to the LDR image data comprises applying the smooth component to the LDR image data only for pixels where the edge-stopping component indicates that application of the brightness enhancement function should increase the luminance of the pixels.

28. A method according to claim 27 wherein applying the smooth component to the LDR image data only for pixels where the edge-stopping component indicates that application of the brightness enhancement function should increase the luminance of the pixels comprises pixel-wise multiplication of the smooth component with the LDR image data.

29. A method according to claim 21 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

30. A method according to claim 29 wherein generating the edge-stopping component comprises:

down-sampling the gradient image of the LDR image data in a series of N down-sampling steps to obtain a set of N down-sampled gradient images;
for each iteration in a loop comprising N iterations:
performing a DILATION operation to the down-sampled mask in an initial iteration and to a result of the previous iteration in other iterations; and
up-sampling a result of the DILATION operation by an up-sampling step.

31. A method according to claim 30 comprising, for each DILATION operation:
identifying one of the set of N down-sampled gradient images having a resolution corresponding to that of a current subject of the DILATION operation; and
stopping the DILATION operation at pixels in the one of the set of N down-sampled gradient images having gradients greater than a threshold.

32. A method according to claim 1 comprising generating the brightness enhancement function, wherein generating the brightness enhancement function comprises:
down-sampling the LDR image data to obtain intermediate-resolution down-sampled image data;
further down-sampling the intermediate-resolution down-sampled image data to obtain lower-resolution down-sampled image data;
generating a lower-resolution mask from the lower-resolution down-sampled image data, the lower-resolution mask identifying pixels inside and outside of the enhancement region; and
for each iteration in a loop comprising N iterations:
applying a blur filter to the lower-resolution mask in an initial iteration and to a result of the previous iteration in other iterations; and
up-sampling a result of the blur filter by an up-sampling step;
wherein a result of the $N^{th}$ iteration of the loop comprises grey-scale image data having the same resolution as the LDR image data.

33. A method according to claim 32 comprising mapping the grey-scale image data to provide a smooth component of the brightness enhancement function, the smooth component having a range of 1-a, where a is a brightness amplification parameter greater than 1.

34. A method according to claim 33 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

35. A method according to claim 34 wherein generating the edge-stopping component comprises:
down-sampling the gradient image of the LDR image data in a series of N down-sampling steps to obtain a set of N down-sampled gradient images;
for each iteration in a first loop comprising M iterations, where M<N:
performing a DILATION operation to the lower-resolution mask in an initial iteration and to a result of the previous iteration in other iterations; and
up-sampling a result of the DILATION operation by an up-sampling step;
wherein a result of the first loop comprises intermediate-resolution edge-stopping data;
for each iteration in a second loop comprising N-M iterations:

performing the DILATION operation to the intermediate-resolution edge-stopping data in an initial iteration and to a result of the previous iteration in other iterations; and
up-sampling a result of the DILATION operation by an up-sampling step;
wherein a result of the second loop comprises full-resolution edge-stopping data having a resolution corresponding to that of the LDR image data.

36. A method according to claim 35 comprising determining first modulator driving values for a first modulator of a dual modulator display used to display the HDR image data based at least in part on the intermediate-resolution down-sampled image data and based at least in part on the intermediate-resolution edge-stopping data.

37. A method according to claim 32 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

38. A method according to claim 37 wherein generating the edge-stopping component comprises:
down-sampling the gradient image of the LDR image data in a series of N down-sampling steps to obtain a set of N down-sampled gradient images;
for each iteration in a first loop comprising M iterations, where M<N:
performing a DILATION operation to the lower-resolution mask in an initial iteration and to a result of the previous iteration in other iterations; and
up-sampling a result of the DILATION operation by an up-sampling step;
wherein a result of the first loop comprises intermediate-resolution edge-stopping data;
for each iteration in a second loop comprising N-M iterations:
performing the DILATION operation to the intermediate-resolution edge-stopping data in an initial iteration and to a result of the previous iteration in other iterations; and
up-sampling a result of the DILATION operation by an up-sampling step;
wherein a result of the second loop comprises full-resolution edge-stopping data having a resolution corresponding to that of the LDR image data.

39. A method according to claim 38 comprising determining first modulator driving values for a first modulator of a dual modulator display used to display the HDR image data based at least in part on the intermediate-resolution down-sampled image data and based at least in part on the intermediate-resolution edge-stopping data.

40. A method according to claim 32 comprising determining first modulator driving values for a first modulator of a dual modulator display used to display the HDR image data based at least in part on the intermediate-resolution down-sampled image data.

41. A non-transitory computer-readable medium comprising a series of instructions which, when executed by a suitably configured processor, cause the processor to perform a method for enhancing lower-dynamic range (LDR) image data representing an image, the method comprising:
identifying at least one enhancement region within the image;
generating a brightness enhancement function, wherein generating the brightness enhancement function comprises:
generating a mask which identifies pixels inside and outside of the enhancement region;
applying a blur filter to the mask to obtain grey-scale image data;
applying the brightness enhancement function to the LDR image data to generate higher-dynamic range (HDR) image data, wherein compared to the LDR image data, the HDR image data comprises increased luminance values of enhancement-region pixels in the enhancement region and increased luminance values of one or more boundary-region pixels outside of the enhancement region, the luminance value increase of the boundary-region pixels decreasing with distance from the enhancement region.

42. A non-transitory computer-readable medium according to claim 41 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

43. A non-transitory computer-readable medium according to claim 41 wherein the method comprises generating the brightness enhancement function, wherein generating the brightness enhancement function comprises:
generating a mask which identifies pixels inside and outside of the enhancement region;
down-sampling the mask to obtain a down-sampled mask;
for each iteration in a loop comprising N iterations:
applying a blur filter to the down-sampled mask in an initial iteration and to a result of the previous iteration in other iterations; and
up-sampling a result of the blur filter by an up-sampling step;
wherein a result of the $N^{th}$ iteration of the loop comprises grey-scale image data having the same resolution as the LDR image data.

44. A non-transitory computer-readable medium according to claim 43 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

45. A non-transitory computer-readable medium according to claim 44 wherein generating the edge-stopping component comprises:
down-sampling the gradient image of the LDR image data in a series of N down-sampling steps to obtain a set of N down-sampled gradient images;
for each iteration in a loop comprising N iterations:
performing a DILATION operation to the down-sampled mask in an initial iteration and to a result of the previous iteration in other iterations; and
up-sampling a result of the DILATION operation by an up-sampling step.

46. A non-transitory computer-readable medium according to claim 41 wherein the method comprises generating the brightness enhancement function, wherein generating the brightness enhancement function comprises:

down-sampling the LDR image data to obtain intermediate-resolution down-sampled image data;
further down-sampling the intermediate-resolution down-sampled image data to obtain lower-resolution down-sampled image data;
generating a lower-resolution mask from the lower-resolution down-sampled image data, the lower-resolution mask identifying pixels inside and outside of the enhancement region; and
for each iteration in a loop comprising N iterations:
applying a blur filter to the lower-resolution mask in an initial iteration and to a result of the previous iteration in other iterations; and
up-sampling a result of the blur filter by an up-sampling step; wherein a result of the $N^{th}$ iteration of the loop comprises grey-scale image data having the same resolution as the LDR image data.

47. A non-transitory computer-readable medium according to claim 46 wherein generating the brightness enhancement function comprises generating an edge-stopping component of the brightness enhancement function based at least in part on a gradient image of the LDR image data, the edge-stopping component having pixel values which indicate whether or not application of the brightness enhancement function should increase the luminance of corresponding pixels of the LDR image data.

48. A non-transitory computer-readable medium according to claim 47 wherein generating the edge-stopping component comprises:
down-sampling the gradient image of the LDR image data in a series of N down-sampling steps to obtain a set of N down-sampled gradient images;
for each iteration in a first loop comprising M iterations, where M<N:
performing a DILATION operation to the lower-resolution mask in an initial iteration and to a result of the previous iteration in other iterations; and
up-sampling a result of the DILATION operation by an up-sampling step;
wherein a result of the first loop comprises intermediate-resolution edge-stopping data;
for each iteration in a second loop comprising N-M iterations:
performing the DILATION operation to the intermediate-resolution edge-stopping data in an initial iteration and to a result of the previous iteration in other iterations; and
up-sampling a result of the DILATION operation by an up-sampling step;
wherein a result of the second loop comprises full-resolution edge-stopping data having a resolution corresponding to that of the LDR image data.

49. A non-transitory computer-readable medium according to claim 48 wherein the method comprises determining first modulator driving values for a first modulator of a dual modulator display used to display the HDR image data based at least in part on the intermediate-resolution down-sampled image data and based at least in part on the intermediate-resolution edge-stopping data.

50. A non-transitory computer-readable medium according to claim 46 wherein the method comprises determining first modulator driving values for a first modulator of a dual modulator display used to display the HDR image data based at least in part on the intermediate-resolution down-sampled image data.

51. A display for displaying a higher-dynamic range (HDR) image obtained from lower-dynamic range (LDR) image data representing an image, the display comprising:
a pair of modulators comprising:
a first modulator configured to provide a light pattern varying in response to a set of driving signals; and
a second modulator configured to modulate the light pattern to yield an output image; and
a processor configured to:
identify at least one enhancement region within the image;
generate a brightness enhancement function and wherein generating the brightness enhancement function involves generating an edge-stopping component of the brightness enhancement function based at least in part on a gradient image of the LDR image data, the edge-stopping component having pixel values which indicate whether or not application of the brightness enhancement function should increase the luminance of a corresponding pixels of the LDR image data and wherein the intermediate data comprises a low resolution version of the edge-stopping component;
apply the brightness enhancement function to the LDR image data to generate the HDR image data, wherein compared to the LDR image data, the HDR image data comprises increased luminance values of enhancement-region pixels in the enhancement region and increased luminance values of one or more boundary-region pixels outside of the enhancement region, the luminance value increase of the boundary-region pixels decreasing with distance from the enhancement region; and determine the driving signals for the first modulator based at least in part on intermediate data obtained in the course of application of the brightness enhancement function to the LDR image data.

52. A display according to claim 51 wherein the intermediate data comprises a down-sampled version of the LDR image data.

53. A method for displaying a higher-dynamic range (HDR) image obtained from lower-dynamic range (LDR) image data, the method comprising:
identifying at least one enhancement region within the LDR image data;
generating a brightness enhancement function and wherein generating the brightness enhancement function comprises generating an edge-stopping component of the brightness enhancement function based at least in part on a gradient image of the LDR image data, the edge-stopping component having pixel values which indicate whether or not application of brightness enhancement function should increase the luminance of corresponding pixels of the LDR image data and wherein the intermediate data comprises a low resolution version of the edge-stopping component;
applying the brightness enhancement function to the LDR image data to generate the HDR image data, wherein compared to the LDR image data, the HDR image data comprises increased luminance values of enhancement-region pixels in the enhancement region and increased luminance values of one or more boundary-region pixels outside of the enhancement region, the luminance value increase of the boundary-region pixels decreasing with distance from the enhancement region; and
determining driving signals for at least one modulator of a dual-modulator display based at least in part on intermediate data obtained in the course of application of the brightness enhancement function to the LDR image data.

54. A method according to claim 52 wherein the intermediate data comprises a down-sampled version of the LDR image data.

* * * * *

UNITED STATES PATENT AND TRADEMARK OFFICE
CERTIFICATE OF CORRECTION

| | | |
|---|---|---|
| PATENT NO. | : 8,233,738 B2 | Page 1 of 1 |
| APPLICATION NO. | : 12/183033 | |
| DATED | : July 31, 2012 | |
| INVENTOR(S) | : Allan G. Rempel et al. | |

It is certified that error appears in the above-identified patent and that said Letters Patent is hereby corrected as shown below:

Col. 24
(In claim 51) ln. 15, "luminance of a corresponding pixels" is changed to --luminance of corresponding pixels--;
(In claim 53) ln. 44, "whether or not application of brightness enhancement function" is changed to --whether or not application of the brightness enhancement function--; and,
(In claim 54) ln. 62, "A method according to claim 52" is changed to --A method according to claim 53--.

Signed and Sealed this
Twenty-third Day of October, 2012

David J. Kappos
*Director of the United States Patent and Trademark Office*